United States Patent
Toida et al.

(10) Patent No.: US 8,524,403 B2
(45) Date of Patent: *Sep. 3, 2013

(54) WATER CONTENT ESTIMATION APPARATUS FOR FUEL CELL AND FUEL CELL SYSTEM

(75) Inventors: Masashi Toida, Nagoya (JP); Masahiro Okuyoshi, Toyota (JP); Masaaki Matsusue, Mishima (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/163,315

(22) Filed: Jun. 17, 2011

(65) Prior Publication Data
US 2011/0274992 A1 Nov. 10, 2011

Related U.S. Application Data

(63) Continuation of application No. PCT/JP2008/073782, filed on Dec. 26, 2008.

(51) Int. Cl.
*H01M 8/02* (2006.01)
*H01M 8/04* (2006.01)

(52) U.S. Cl.
USPC .......................... 429/413; 429/428; 429/433

(58) Field of Classification Search
USPC ......................................... 429/413, 428, 433
See application file for complete search history.

(56) References Cited

U.S. PATENT DOCUMENTS

| | | | |
|---|---|---|---|
| 6,120,925 A | 9/2000 | Kawatsu et al. | |
| 6,960,401 B2 | 11/2005 | Barton et al. | |
| 6,964,824 B2 * | 11/2005 | Enjoji et al. | 429/434 |
| 2002/0009623 A1 | 1/2002 | St-Pierre et al. | |
| 2002/0180448 A1 * | 12/2002 | Imamura et al. | 324/439 |
| 2002/0192520 A1 * | 12/2002 | Nonobe | 429/23 |
| 2005/0053814 A1 | 3/2005 | Imamura et al. | |
| 2007/0092771 A1 | 4/2007 | Wake | |
| 2007/0172720 A1 | 7/2007 | Mogi et al. | |

FOREIGN PATENT DOCUMENTS

| | | | |
|---|---|---|---|
| JP | 2002164069 A | * | 6/2002 |
| JP | 2002-231283 A | | 8/2002 |
| JP | 2002-280027 A | | 9/2002 |
| JP | 2003-331886 A | | 11/2003 |
| JP | 2004039551 A | * | 2/2004 |
| JP | 2004-111196 A | | 4/2004 |
| JP | 2004-146267 A | | 5/2004 |
| JP | 2004146236 A | * | 5/2004 |

(Continued)

OTHER PUBLICATIONS

ISR issued Apr. 28, 2009 in PCT/JP2008/073782.

(Continued)

*Primary Examiner* — Gregg Cantelmo
(74) *Attorney, Agent, or Firm* — Kenyon & Kenyon LLP

(57) ABSTRACT

The water content estimation apparatus for a fuel cell includes an estimating unit for estimating a residual water content distribution in a reactant gas flow channel and a moisture content distribution in an electrolyte membrane in a cell plane of a single cell while taking into consideration water transfer that occurs between an anode electrode and a cathode electrode via the electrolyte membrane between the anode electrode and the cathode electrode. The fuel cell system performs control based on an estimation result by the estimating unit so that the fuel cell assumes a predetermined water condition.

22 Claims, 20 Drawing Sheets

(56) References Cited

FOREIGN PATENT DOCUMENTS

| | | |
|---|---|---|
| JP | 2004-207139 A | 7/2004 |
| JP | 2004-335444 A | 11/2004 |
| JP | 2005-222854 A | 8/2005 |
| JP | 2006-073427 A | 3/2006 |
| JP | 2006-100093 A | 4/2006 |
| JP | 2006-120342 A | 5/2006 |
| JP | 2006-156059 A | 6/2006 |
| JP | 2006-156411 A | 6/2006 |
| JP | 2006-196262 A | 7/2006 |
| JP | 2006-202696 A | 8/2006 |
| JP | 2006-236862 A | 9/2006 |
| JP | 2006-526271 A | 11/2006 |
| JP | 2007-035389 A | 2/2007 |
| JP | 2007-048650 A | 2/2007 |
| JP | 2007-141812 A | 6/2007 |
| JP | 2007-149572 A | 6/2007 |
| JP | 2007-172953 A | 7/2007 |
| JP | 2007-173071 A | 7/2007 |
| JP | 2007-207560 A | 8/2007 |
| JP | 2007-207725 A | 8/2007 |
| JP | 2007-227212 A | 9/2007 |
| JP | 2007-287547 A | 11/2007 |
| JP | 2007-288850 A | 11/2007 |
| JP | 2007-305420 A | 11/2007 |
| JP | 2008-034136 A | 2/2008 |
| JP | 2008-041505 A | 2/2008 |
| JP | 2008-041625 A | 2/2008 |
| JP | 2008-053168 A | 3/2008 |
| JP | 2008-091329 A | 4/2008 |
| JP | 2008-130444 A | 6/2008 |
| JP | 2008-140734 A | 6/2008 |
| JP | 2008251489 A * | 10/2008 |
| JP | 2008-293805 A | 12/2008 |
| JP | 2009-004151 A | 1/2009 |

OTHER PUBLICATIONS

International Search Report for PCT/JP2008-073784 dated Apr. 28, 2009.
International Search Report for PCT/JP2008-073786 dated Apr. 28, 2009.
International Search Report for PCT/JP2008-073791 dated Apr. 28, 2009.
English Translation of IPRP for U.S. Appl. No. 13/163,083 dated Aug. 16, 2011.
Office Action for U.S. Appl. No. 13/163,381 dated Oct. 26, 2011.
Final Office Action for U.S. Appl. No. 13/163,381 dated Mar. 28, 2012.
Office Action for U.S. Appl. No. 13/163,234 dated Nov. 8, 2011.
Office Action for U.S. Appl. No. 13/163,234 dated Apr. 11, 2012.
Final Office Action for U.S. Appl. No. 13/163,234 dated Oct. 5, 2012.
Office Action for U.S. Appl. No. 13/163,083 dated Nov. 9, 2011.
Office Action for U.S. Appl. No. 13/106,629 dated Nov. 9, 2011.
Final Office Action for U.S. Appl. No. 13/106,629 dated Apr. 10, 2012.

* cited by examiner

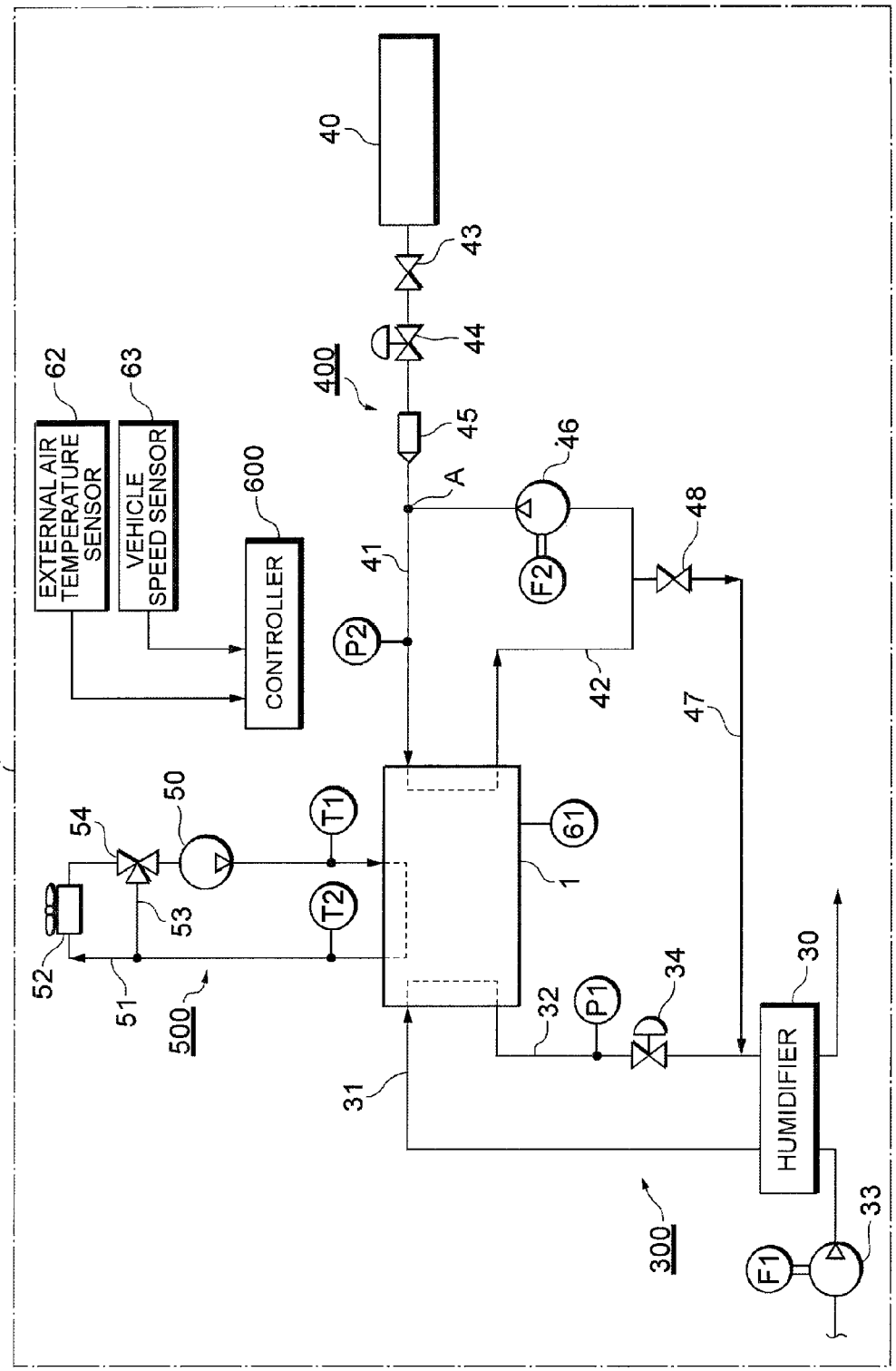

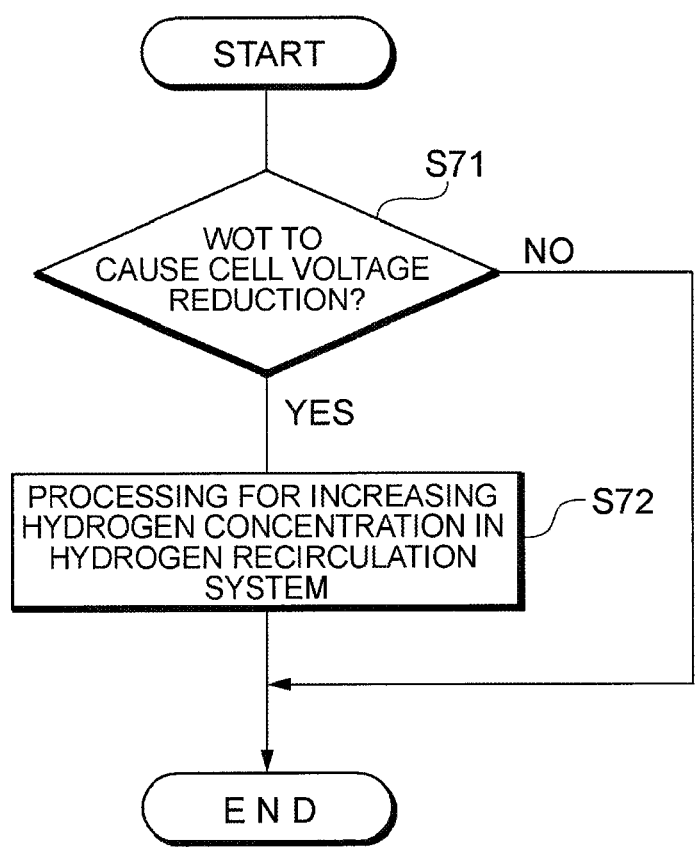

WATER CONTENT ESTIMATION APPARATUS FOR FUEL CELL AND FUEL CELL SYSTEM

This is a continuation application of PCT/JP2008/073782 filed 26 Dec. 2008, the content of which is incorporated herein by reference.

TECHNICAL FIELD

The present invention relates to a technique for estimating a water content of a proton-exchange membrane fuel cell, and more particularly to a water content estimation apparatus for a fuel cell and a fuel cell system for estimating a water content in a cell plane of the fuel cell.

BACKGROUND ART

As is conventionally well known, efficient power generation by a proton-exchange membrane fuel cell desirably involves keeping an electrolyte membrane in a moderately wet condition and preventing a water content inside the fuel cell from becoming deficient or excessive. An example of a known technique for controlling the water content in a cell plane of a fuel cell is described in Patent Document 1 (Japanese Patent Laid-Open No. 2004-335444). Patent Document 1 discloses controlling the distribution of water content as droplets or water vapor in a cell plane by adjusting at least one of pressure, humidity, temperature, and flow rate of a reactant gas (a general term for oxidation gas typified by air and fuel gas typified by hydrogen gas) and pressure drop characteristics defined by flow channel geometry.

DISCLOSURE OF THE INVENTION

Problems to be Solved by the Invention

However, in an actual single cell, transfer of water through an electrolyte membrane occurs between an anode electrode and a cathode electrode. In this regard, Patent Document 1 does not consider water transfer between electrodes and thus it is difficult for Patent Document 1 to accurately estimate and control water content distribution in a call plane.

Further, the water content in a cell plane includes moisture content impregnated in an electrolyte membrane in addition to residual water content existing as liquid water in a reactant gas flow channel. The residual water content and the moisture content affect the single cell in different ways. In this regard, the total lack of consideration for moisture content by Patent Document 1 creates a possibility of control being performed resulting in excessive drying of the electrolyte membrane while attempting to reduce the residual water content.

It is an object of the present invention to provide a water content estimation apparatus for a fuel cell and a fuel cell system which are capable of accurately determining a water content in a cell plane.

Means for Solving the Problems

In order to achieve the object described above, a water content estimation apparatus for a fuel cell according to the present invention estimates a water content of a full cell including a single cell, the single cell having an anode electrode, a cathode electrode, an electrolyte membrane existing between the anode electrode and the cathode electrode, and a reactant gas flow channel, the water content estimation apparatus for a fuel cell comprising an estimating unit for estimating a residual water content distribution in the reactant gas flow channel and a moisture content distribution in the electrolyte membrane in a cell plane of the single cell while taking into consideration water transfer that occurs between the anode electrode and the cathode electrode via the electrolyte membrane.

According to the present invention, since water transfer between electrodes is taken into consideration, the moisture content in the electrolyte membrane and the residual water content in the reactant gas flow channel can be accurately determined. Consequently, the accuracy of estimating the residual water content distribution and the moisture content distribution in a cell plane can be improved and thus it is possible to adequately perform countermeasure control based on the estimations.

Preferably, the reactant gas flow channel may include a fuel gas flow channel for supplying fuel gas to the anode electrode and an oxidation gas flow channel for supplying oxidation gas to the cathode electrode. The estimating unit may respectively estimate a residual water content distribution in the cell plane for the fuel gas flow channel and the oxidation gas flow channel.

Accordingly, countermeasure control such as adjusting a residual water content in one of the fuel gas flow channel and the oxidation gas flow channel while taking into consideration a residual water content distribution of the other flow channel can be performed adequately and individually.

More preferably, the fuel cell may include a cell laminate formed by laminating a plurality of single cells, and the estimating unit may estimate a residual water content distribution and a moisture content distribution of each single cell.

Normally, since water content differs according to a position with respect to a cell lamination direction, estimating a residual water content distribution and a moisture content distribution in the cell lamination direction enables countermeasure control that takes into consideration residual water content distributions and moisture content distributions of all single cells to be performed adequately.

Preferably, the estimating unit may estimate the residual water content distribution and the moisture content distribution of each single cell while taking into consideration at least one of a temperature distribution and a pressure drop distribution of the cell laminate in the cell lamination direction.

Accordingly, since factors that contribute to different water contents (temperature distribution, pressure drop distribution) can be taken into consideration, a residual water content distribution and a moisture content distribution of each single cell can be estimated with greater accuracy.

More preferably, the temperature distribution may include a variation in heat discharge corresponding to a position of a single cell in the cell lamination direction. In addition, in a configuration where a coolant is supplied to each single cell, the estimating unit preferably may calculate a temperature regarding each single cell while taking into consideration at least one of an external air temperature and a coolant flow rate to the cell laminate. More preferably, the estimating unit may calculate temperatures on an inlet side and an outlet side of the coolant of each single cell as the temperature regarding each single cell.

Preferably, the pressure drop distribution may include a flow distribution variation of fuel gas and oxidation gas corresponding to a position of a single cell in the cell lamination direction. In addition, in a configuration where a coolant is supplied to each single cell, the pressure drop distribution may include a variation in coolant flow distribution corresponding to positions of single cells in the cell lamination direction.

Preferably, the estimating unit may calculate a rate of water transfer via the electrolyte membrane between the anode electrode and the cathode electrode based on a difference in water vapor partial pressure between the anode electrode-side and the cathode electrode-side, and may estimate a residual water content distribution and a moisture content distribution based on the calculated water transfer rate. More preferably, the estimating unit may calculate humidity distributions of the reactant gas flow channel and the electrolyte membrane using the calculated water transfer rate, and may estimate a moisture content distribution based on the calculated electrolyte membrane humidity distribution. Even more preferably, the estimating unit may estimate a residual water content distribution by adding a variance in liquid water in the reactant gas flow channel to the calculated humidity distribution of the reactant gas flow channel. Still more preferably, the estimating unit may calculate a difference in water vapor partial pressure by measuring or calculating a dew point on the anode electrode-side and a dew point on the cathode electrode-side.

A fuel cell system according to the present invention comprises the water content estimation apparatus for a full cell according to the present invention described above and an operation control unit that controls operation of the fuel cell system based on an estimation result by the estimating unit so that the fuel cell is set to a predetermined water condition.

With the fuel cell system according to the present invention, since a highly-accurate estimation result is to be used, residual water contents and moisture contents in all single cells can be optimized and auxiliary power loss and the like can be avoided. For example, countermeasure control corresponding to a single cell in a most unfavorable state in the cell lamination direction can be implemented and deterioration of single cells can be suppressed.

Preferably, the operation control unit may execute water reduction control so that a residual water content in a single cell at an end of the cell laminate (hereinafter, referred to as an end cell) does not exceed a predetermined upper limit.

Accordingly, since pressure drop of the reactant gas at the end cell with a reduced residual water content decreases, a required stoichiometry can be secured even when, for example, a WOT (Wide Open Throttle: a full opening of a throttle valve) request is issued in a vehicle-mounted state. In addition, since water reduction control is executed based on the residual water content of the end cell that is likely to have the highest residual water content in the cell lamination direction, residual water contents in the other single cells can also be reduced so that the predetermined upper limit is not exceeded.

More preferably, the operation control unit may suspend the execution of water reduction control so that a residual water content or a moisture content of a single cell at a central part of the cell laminate exceeds a predetermined lower limit.

Accordingly, excessive drying of the electrolyte membrane due to the execution of water reduction control can be suppressed. Since a single cell in the central part which has a relatively low residual water content among the cell laminate is used as a norm, excessive drying of the electrolyte membrane of other single cells can also be suppressed.

Preferably, the operation control unit may execute water reduction control by controlling a device that varies a state quantity of fuel gas or oxidation gas to the fuel cell. More preferably, the device may include at least one of a pump that feeds fuel gas to the fuel cell under pressure, a compressor that feeds oxidation gas to the fuel cell under pressure, and a back pressure valve that regulates a back pressure of the oxidation gas in the fuel cell.

Such configurations enable water reduction control to be executed while efficiently using a device normally mounted on the fuel cell system.

A fuel cell system according to a preferable aspect of the present invention further may comprise a coolant piping system for supplying a coolant to each single cell, and the operation control unit controls the coolant piping system so as to equalize temperature distribution of the cell laminate in the cell lamination direction in a case where it is estimated that the residual water content in the end cell has increased due to a decrease in temperature.

Accordingly, since the coolant piping system is efficiently used to equalize a variation in the temperature distribution of the cell laminate and thus a variation in pressure drop of the cell laminate, deterioration of a single cell clue to insufficient stoichiometry or the like can be suppressed.

According to another preferable aspect of the present invention, the operation control unit may vary a state quantity of fuel gas or oxidation gas to the fuel cell so as to equalize a residual water content in a cell plane in a case where it is estimated that the residual water content in the cell plane is locally high.

Consequently, the water condition of a single cell can be optimized and auxiliary power loss can be reduced. Methods of equalizing the residual water content include increasing the number of revolutions of the aforementioned pump or compressor.

Preferably, the operation control unit may vary a state quantity of fuel gas to the fuel cell in a case where it is estimated that the residual water content of the fuel gas flow channel is locally high and may vary a state quantity of oxidation gas to the fuel cell in a case where it is estimated that the residual water content of the oxidation gas flow channel is locally high.

Consequently, processing corresponding to respective residual water contents of the fuel gas flow channel and the oxidation gas flow channel can be performed.

According to yet another preferable aspect of the present invention, the operation control unit may vary a state quantity of fuel gas or oxidation gas to the fuel cell so as to suppress drying of the electrolyte membrane in a case where it is estimated that the moisture content at an arbitrary position of the electrolyte membrane is low.

Consequently, deterioration of the electrolyte membrane due to drying can be suppressed. Methods of suppressing drying of the electrolyte membrane by varying a state quantity of the oxidation gas include reducing a supply amount or increasing back pressure.

According to still another preferable aspect of the present invention, the operation control unit may increase a fuel concentration of fuel gas to the fuel cell in a case where a drop in cell voltage due to a rapid output increase request is predicted based on an estimated residual water content of the fuel gas flow channel.

Consequently, for example, oxidation of the anode electrode or the cathode electrode due to fuel deficiency can be suppressed.

BEST MODE FOR CARRYING OUT THE INVENTION

Hereinafter, a preferred embodiment of the present invention will be described with reference to the accompanying drawings. First, an overview of a fuel cell system including a fuel cell and a water content estimation apparatus thereof for the fuel cell will be described, followed by a description of an estimation of a water content of a fuel cell and a control example using the estimation. Hereinafter, hydrogen gas will be described as an example of a fuel gas and air will be described as an example of an oxidation gas. A fuel gas and an oxidation gas may collectively be described as a reactant gas.

A. Overview of Fuel Cell

As illustrated in FIGS. 1 and 2, a fuel cell 1 with a stack structure includes a cell laminate 3 formed by laminating a plurality of single cells 2 of the proton-exchange membrane type. Collector plates 5a, 5b, insulating plates 6a, 6b, and end-plates 7a, 7b are respectively arranged on outer sides of single cells 2 on both ends of the cell laminate 3 (hereinafter, referred to as "end cells 2a"). Tension plates 8, 8 are bridged across the end-plates 7a, 7b and fixed by a bolt 9. An elastic module 10 is provided between the end-plate 7b and the insulating plate 6b.

Hydrogen gas, air, and a coolant are supplied to a manifold 15a inside the cell laminate 3 from a supply pipe 14 connected to supply ports 11a, 12a, and 13a of the end-plate 7a. Subsequently, the hydrogen gas, air, and the coolant flow in a planar direction of the single cell 2 and reach a manifold 15b inside the cell laminate 3, and are discharged to the outside of the fuel cell 1 from an exhaust pipe 16 connected to exhausts 11b, 12b and 13b of the end-plate 7a. Note that although the supply pipe 14, the manifolds 15a, 15b, and the exhaust pipe 16 are provided corresponding to each fluid (hydrogen gas, air, and coolant), same reference characters are assigned in FIG. 2 and descriptions thereof are omitted.

As illustrated in FIG. 3, the single cell 2 includes an MEA 20 and a pair of separators 22A, 22B. The MEA 20 (Membrane Electrode Assembly) is constituted by an electrolyte membrane 23 made of an ion-exchange membrane, and an anode electrode 24A and a cathode electrode 24B which sandwich the electrolyte membrane 23. A hydrogen flow channel 25A of the separator 22A faces the electrode 24A while an air flow channel 25B of the separator 22B faces the electrode 24B. In addition, coolant flow channels 26A, 26B of the separators 22A, 22B communicate with each other between adjacent single cells 2, 2.

FIG. 4 is a plan view of the separator 22A. The separator 22A includes a hydrogen inlet 27a, an air inlet 28a, a coolant inlet 29a, a hydrogen outlet 27b, an air outlet 28b, and a coolant outlet 29b respectively penetratingly formed on an outer side of the hydrogen flow channel 25A. Inlets 27a, 28a, and 29a constitute a part of the manifold 15a that corresponds to each fluid. In the same manner, outlets 27b, 28b, and 29b constitute a part of the manifold 15b that corresponds to each fluid.

At the separator 22A, hydrogen gas is introduced into a hydrogen flow channel 40 from the inlet 27a and discharged to the outlet 27b. The coolant flows in a similar manner. In addition, while a detailed description will not be given, air also flows in a planar direction in the separator 22B configured similar to the separator 22A. In this manner, hydrogen gas and air are supplied to the electrodes 24A, 24B in the single cell 2 to cause an electrochemical reaction inside the MEA 20 which produces electromotive force. Furthermore, the electrochemical reaction also generates water and heat on the side of the electrode 24B. The heat at each single cell 2 is reduced due to subsequent flow of the coolant.

FIGS. 5A to 5C are schematic plan views illustrating other flow channel geometries of a separator to which the present embodiment is applicable. In place of the mode of the straight gash flow channel (repetitive concavities and convexities extending in a single direction) illustrated in FIG. 4, the flow channel geometries of the flow channels 25A, 25B, 26A, and 26B can take a serpentine flow channel shape having folded portions midway as illustrated in FIG. 5A. In addition, as illustrated in FIG. 5B, the flow channels 25A, 25B, 26A, and 26B can take a wavy form or, as illustrated in FIG. 5C, a flat plate-like form without concavities and convexities. Furthermore, as for the flow pattern of the reactant gas, a counterflow type in which hydrogen gas and air flow in opposite directions may be adopted in place of the coflow type (in which hydrogen gas and air flow in the same direction) as can be understood from FIGS. 1 and 4. Moreover, the separators 22A, 22B may be oriented either vertically or horizontally. In other words, estimation of a water content of the fuel cell 1 to be described later is not limited to a hardware configuration of the fuel cell 1.

B. Overview of Fuel Cell System

As illustrated in FIG. 6, a fuel cell system 100 includes an air piping system 300, a hydrogen piping system 400, a coolant piping system 500, and a controller 600. In addition to being mountable on various mobile objects such as a vehicle, a ship, an airplane, and a robot, the fuel cell system 100 is applicable to a stationary power source. Here, an example of the fuel cell system 100 mounted on a vehicle will be described.

The air piping system 300 is responsible for supplying air to and discharging air from the fuel cell 1, and includes a humidifier 30, a supply flow channel 31, an exhaust flow channel 32, and a compressor 33. Atmospheric air (air in a low moisture condition) is taken in by the compressor 33 and force-fed to the humidifier 30. Water exchange between atmospheric air and an oxidation off-gas in a high moisture condition is performed at the humidifier 30. As a result, adequately humidified air is supplied from the supply flow channel 31 to the fuel cell 1. A back pressure valve 34 for regulating an air back pressure of the fuel cell 1 is provided at the exhaust flow channel 32. In addition, a pressure sensor P1 for detecting an air back pressure is provided in the vicinity of the back pressure valve 34. A flow rate sensor F1 for detecting an air supply flow rate to the fuel cell 1 is provided at the compressor 33.

The hydrogen piping system 400 is responsible for supplying hydrogen gas to and discharging hydrogen gas from the fuel cell 1, and includes a hydrogen supply source 40, a supply flow channel 41, a circulatory flow channel 42, a shut valve 43, and the like. After hydrogen gas from the hydrogen supply source 40 is depressurized by a regulator 44, a flow rate and pressure of the hydrogen gas are regulated with high accuracy by an injector 45. Subsequently, hydrogen gas merges with a hydrogen off-gas force-fed by a hydrogen pump 46 on the circulatory flow channel 42 at a confluence A to be supplied to the fuel cell 1. A purge channel 47 with a purge valve 48 is branchingly connected to the circulatory flow channel 42. The hydrogen off-gas is discharged to the exhaust flow channel 32 by opening the purge valve 48. A pressure sensor P2 that detects a supply pressure of hydrogen gas to the fuel cell 1 is provided on a downstream-side of the confluence A. In addition, a flow rate sensor F2 is provided on the hydrogen pump 46. Moreover, in other embodiments, a fuel off-gas may be introduced to a hydrogen diluter or a gas-liquid separator may be provided at the circulatory flow channel 42.

The coolant piping system 500 is responsible for circulating a coolant (for example, cooling water) to the fuel cell 1, and includes a cooling pump 50, a coolant flow channel 51, a radiator 52, a bypass flow channel 53, and a switching valve 54. The cooling pump 50 force-feeds a coolant inside the coolant flow channel 51 into the fuel cell 1. The coolant flow channel 51 includes a temperature sensor T1 located on a coolant inlet-side of the fuel cell 1 and a temperature sensor T2 located on a coolant outlet-side of the fuel cell 1. The radiator 52 cools the coolant discharged from the fuel cell 1. The switching valve 54 is made of, for example, a rotary valve and switches coolant conduction between the radiator 52 and the bypass flow channel 53 as required.

The controller 600 is configured as a microcomputer internally provided with a CPU, a ROM, and a RAM. Detected information from the sensors (P1, P2, F1, F2, T1, and T2) that detect pressure, temperature, flow rate, and the like of fluids flowing through the respective piping systems 300, 400, and 500 are inputted to the controller 600. In addition, detected information of a current sensor 61 that detects a value of a current generated by the fuel cell 1, as well as detected information from an external air temperature sensor 62, a vehicle speed sensor 63, an accelerator opening sensor, and the like, are inputted to the controller 600. In response to such detected information and the like, the controller 600 controls the various devices (the compressor 33, the shut valve 43, the injector 45, the hydrogen pump 46, the purge valve 48, the cooling pump 50, the switching valve 54, and the like) in the system 100 so as to integrally control operations of the fuel cell system 100. Furthermore, the controller 600 reads various detected information, and estimates a water content of the fuel cell 1 using various maps stored in the ROM.

As illustrated in FIG. 7, the controller 600 includes a storage unit 65, a detecting unit 66, an estimating unit 67, and an operation control unit 68 as function blocks for estimating the water content of the fuel cell 1 and realizing control based on the estimation. The storage unit 65 stores various programs and various maps for estimating a water content of the fuel cell 1 and realizing control of the fuel cell 1. The maps are to be obtained in advance by experiment or simulation. The detecting unit 66 reads detected information of the various sensors (P1, P2, F1, F2, T1, T2, and 61 to 63) and the like. Based on an estimation result by the estimating unit 67, the operation control unit 68 transmits control instructions to the various devices and controls operation so as to place the fuel cell 1 in a desired operational state (for example, a water condition, a temperature condition, or the like). At this point, as required, the operation control unit 68 executes control that distinguishes between the anode side and the cathode side.

Based on the information acquired by the detecting unit 66, the estimating unit 67 references the various maps in the storage unit 65 to estimate a water content of the fuel cell 1. More specifically, the estimating unit 67 estimates a residual water content distribution and a moisture content distribution in a cell plane of the single cell 2 while taking into consideration water transfer that occurs between the electrodes 24A and 24B via the electrolyte membrane 23. In addition, the estimating unit 67 also estimates a residual water content distribution and a moisture content distribution of each single cell 2 in a lamination direction (hereinafter, referred to as cell lamination direction).

Here, "in a cell plane" refers to the inside of a single cell 2 in a planar direction (a direction parallel to a plane of paper of FIG. 4 and perpendicular to the cell lamination direction) of the single cell 2. "Residual water content" refers to an amount of liquid water existing in the reactant gas flow channel of the single cell 2. "Reactant gas flow channel" is a concept that collectively designates the hydrogen flow channel 25A and the air flow channel 25B. "Moisture content" refers to an amount of water contained in the electrolyte membrane 23 of the single cell 2.

C. Estimation Method of Water Content of Fuel Cell

A water content estimation method according to the present embodiment involves separately estimating a residual water content and a moisture content and, in doing so, estimating a residual water content distribution separately for the anode side and the cathode side. In addition, distributions of a residual water content and a moisture content in the cell lamination direction are estimated in addition to distributions in a cell plane. Hereinafter, firstly, an estimation method of water distribution (a residual water content distribution and a moisture content distribution) in a cell plane will be described. Subsequently, a description will be given on how temperature variation and flow distribution variation in the cell lamination direction are considered during estimation, followed by a description on a water distribution estimation method in the cell lamination direction.

1. Estimation Method of Water Distribution in a Cell Plane

As illustrated in FIG. 8, firstly, a current value I, a cell inlet temperature $T_{in,i}$ a cell outlet temperature $T_{OUT,i}$, an air flow rate $Q_{air,i}$, a hydrogen flow rate $Q_{H2,i}$ an air back pressure $P_{air,i}$, and a hydrogen pressure $P_{H2,i}$ are read (step S1).

Here, the current value I is a value detected by the current sensor 61. The subscript "i" in cell inlet temperature $T_{in,i}$ and the like designates the cell channel indicating a position of the single cell 2 in the cell laminate 3. More specifically, in a case where the cell laminate 3 illustrated in FIG. 9 is taken as a model, a cell channel "i" of an end cell 2a nearest to the supply port (corresponding to the supply ports 11a and 12a in FIG. 1) and the exhaust (corresponding to the exhausts 11b and 12b in FIG. 1) of the reactant gas takes a value of 1. In a case where 200 single cells 2 are laminated, the cell channel "i" of the other end cell 2a takes a value of 200.

The cell inlet temperature $T_{in,i}$ and the cell outlet temperature $T_{OUT,i}$ respectively indicate coolant temperatures at the coolant inlet 29a and the coolant outlet 29b of the single cell 2 (cell channel: i). The air flow rate $Q_{air,i}$ and the hydrogen flow rate $Q_{H2,i}$ respectively indicate supply flow rates of air and hydrogen gas which flow into the air inlet 28a and the hydrogen inlet 27a of the single cell $2_i$. The air back pressure $P_{air,i}$ and the hydrogen pressure $P_{H2,i}$ respectively indicate pressures of air and hydrogen gas at the air outlet 28b and the hydrogen inlet 27a of the single cell $2_i$. The following applies in a case where the fuel cell has only one single cell 2 or in a case where temperature variation and flow distribution variation in the cell lamination direction are not considered.

$T_{in,i}$: detected value by the temperature sensor T1
$T_{OUT,i}$: detected value by the temperature sensor T2
$Q_{air,i}$: detected value by the flow rate sensor F1
$Q_{H2,i}$: hydrogen supply flow rate calculated from a detected value by the flow rate sensor F2
$P_{air,i}$: detected value by the pressure sensor P1
$P_{H2,i}$: detected value by the pressure sensor P2

On the other hand, in a case where the fuel cell 1 includes a plurality of single cells 2, heat discharge, pressure drop, and the like differ depending on positions in the cell lamination direction. Therefore, a heat discharge variation and flow distribution variations of the reactant gas and the coolant exist among the single cells 2. Accordingly, a cell inlet temperature $T_{in,i}$ and the like which take the above into consideration are desirably used. The method of consideration will be described later.

Values from sensors other than those described above or values calculated by other calculation methods may be used as the respective detected values used as the cell inlet temperature $T_{in,i}$ and the like. In other words, a temperature sensor, a flow rate sensor, and a pressure sensor may be provided at positions other than those illustrated in FIG. 6 and design changes to the numbers and positions thereof may be performed as appropriate. For example, a hydrogen flow rate sensor may be provided near the hydrogen supply port 11a of the fuel cell 1 and a detected value of the sensor be used as the hydrogen flow rate $Q_{H2,i}$. In addition, the cell inlet temperature $T_{in,i}$ and the cell outlet temperature $T_{OUT,i}$ can also be estimated by mounting temperature sensors to the end cell 2a or the end-plates 7a, 7b. As shown, by measuring a temperature of the fuel cell stack itself as opposed to a temperature of the coolant, water estimation can be performed with higher accuracy.

In step S2 illustrated in FIG. 8, a cathode inlet dew point $T_{d,cA}$ and an anode inlet dew point $T_{d,AN}$ of each single cell $2_i$ are calculated from the cell inlet temperature $T_{in,i}$. In the present embodiment, since the humidifier 30 is used in the fuel cell system 1, the cell inlet temperature $T_{in,i}$ can be used as the cathode inlet dew point $T_{d,CA}$ and the anode inlet dew point $T_{d,AN}$, respectively. In other words, in a case where the air inlet 28a and the hydrogen inlet 27a are close to the coolant inlet 29a, the following expression becomes true and a lamination variation of dew points can be taken into consideration.

$$T_{d,CA} = T_{d,AN} = T_{in,i}$$

Moreover, in step S2, the cathode inlet dew point $T_{d,CA}$ and the anode inlet dew point $T_{d,AN}$ of each single cell $2_i$ can be calculated from the cell outlet temperature $T_{out,i}$. Furthermore, in another embodiment, a dew-point meter may be used. For example, in a case where a humidifier is not used in the fuel cell system 1 or in a case where the cell inlet temperature $T_{in,i}$ is not used, dew-point meters may respectively be installed at stack inlets (the anode-side supply port 11a and the cathode-side supply port 12a) of the fuel cell 1 and the detected values of the dew-point meters be set as the cathode inlet dew point $T_{d,CA}$ and the anode inlet dew point $T_{d,AN}$. Such a configuration enables estimation with higher accuracy.

In addition, in an air non-humidification system in which the humidifier 30 is not mounted on the air piping system 300, the cathode inlet dew point $T_{d,CA}$ may be calculated as being 0° C. Alternatively, the cathode inlet dew point $T_{d,CA}$ may be calculated by a function of external air temperature and external humidity using an external air temperature sensor and an external humidity sensor. In other words, the present estimation method can also be applied to a non-humidification system.

In step S3 illustrated in FIG. 8, a water transfer rate $V_{H2O,CA \to AN}$ between the electrodes 24A, 24B is determined. The water transfer rate $V_{H2O,CA \to AN}$ is calculated as follows.

$$V_{H2O,CA \to AN} = D_{H2O} \times (P_{H2O,CA} - P_{H2O,AN})$$

In the above expression, $P_{H2O,CA}$ is a water vapor partial pressure on the side of the electrode 24B of the single cell $2_i$ and is calculated from the cathode inlet dew point $T_{d,CA}$. In addition, $P_{H2O,AN}$ is a water vapor partial pressure on the side of the electrode 24A of the single cell $2_i$ and is calculated from the anode inlet dew point $T_{d,AN}$. $D_{H2O}$ denotes water diffusivity in the electrolyte membrane 23. While a constant value can be used as $D_{H2O}$, since variances occur due to humidity, such variances are desirably taken into consideration.

For example, a characteristic map representing a relationship between a relative humidity of the electrolyte membrane 23 and $D_{H2O}$ such as that illustrated in FIG. 10 may be created in advance, and using the characteristic map, a value of $D_{H2O}$ corresponding to the relative humidity of the electrolyte membrane 23 may be used. More specifically, a value ($\beta$) of $D_{H2O}$ to be used in an upcoming estimation can be determined from the map using a relative humidity $\alpha$ of the electrolyte membrane 23 estimated upon shutdown of a previous operation of the fuel cell 1, a relative humidity $\alpha$ of the electrolyte membrane 23 estimated during a downtime (suspension) of the fuel cell 1, or a relative humidity $\alpha$ of the electrolyte membrane 23 estimated at the fuel cell 1 immediately before the upcoming estimation.

In step S4 illustrated in FIG. 8, a current density $i_x$ (where x is any natural number) is calculated using a map from the water transfer rate $V_{H2O,CA \to AN}$, the dew point $T_{d,CA}$, the dew point $T_{d,AN}$, the temperature $T_{OUT,i}$, the air back pressure $P_{air,i}$, the hydrogen pressure $P_{H2,i}$, the air flow rate $Q_{air,i}$, the hydrogen flow rate $Q_{H2,i}$, and the current value I. The current density $i_x$ is a current density over an arbitrary area in the cell plane. For example, if respective areas for x=4 are to be denoted as $s_1$ to $s_4$, then $I = i_1 \times s_1 + i_2 \times s_2 + i_3 \times s_3 + i_4 \times s_4$. An example of a calculation result of a distribution of the current density $i_x$ is illustrated in FIG. 11.

In addition, a current distribution and a relative humidity distribution in a cell plane are calculated in step S4. Functions I and RH which represent the distributions may be expressed as follows. Moreover, sensitivities of the functions I and RH with respect to each parameter ($T_{d,CA}$, $T_{d,AN}$, $T_{OUT,i}$, $P_{air,i}$, $P_{H2,i}$, $Q_{air,i}$, $Q_{H2,i}$, $V_{H2O,CA \to AN}$, $i_x$) are to be mapped in advance. In addition, an overvoltage distribution in the cell plane may also be calculated based on the parameters.

$$I = f(T_{d,CA}, T_{d,AN}, T_{OUT,i}, P_{air,i}, P_{H2,i}, Q_{air,i}, Q_{H2,i}, V_{H2O,CA \to AN}, i_x)$$

$$RH = f(T_{d,CA}, T_{d,AN}, T_{OUT,i}, P_{air,i}, P_{H2,i}, Q_{air,i}, Q_{H2,i}, V_{H2O,CA \to AN}, i_x)$$

FIG. 12 is a diagram illustrating an example of relative humidity distributions (relative humidity distributions of the reactant gas flow channel and the electrolyte membrane) in a cell plane calculated in step S4. In the present embodiment, a counterflow flow channel mode is taken as an example so that flows of hydrogen gas and air are shown in relation to a position in a cell plane in FIG. 12. As illustrated in FIG. 12, while relative humidity has exceeded 100% and is in a supersaturated state from the hydrogen inlet 27a to the hydrogen outlet 27b in an AN flow channel (the hydrogen flow channel 25A), relatively humidity is below 100% on the side of the air outlet 28b in a CA flow channel (the air flow channel 25B). In addition, a central part (a central part of the single cell 2) of the electrolyte membrane 23 is in a supersaturated state.

In step S5 illustrated in FIG. 8, a degree of supersaturation $\sigma_1$ (an amount corresponding to relative humidity over 100%) and a degree of undersaturation $\sigma_2$ (an amount corresponding to relative humidity under 100%) are respectively calculated for the anode side and the cathode side from the relative humidity distribution result illustrated in FIG. 12, and a liquid water generation rate $V_{vap \to liq}$ and a liquid water evaporation rate $V_{liq \to vap}$ are calculated from the expressions given below. $V_{vap \to liq}$ and $V_{liq \to vap}$ in the hydrogen flow channel 25A and the air flow channel 25B are respectively calculated in consideration of the fact that phases (gas phase, liquid phase) of water vary in the reactant gas flow channel.

$$V_{vap \to liq} = k_1 \times \sigma_1$$

$$V_{liq \to vap} = k_2 \times \sigma_2$$

In the above expressions, coefficients $k_1$, $k_2$ represent factors due to temperature and water repellency and attributable to properties of the reactant gas flow channel. The coefficients $k_1$, $k_2$ are to be mapped in advance from an experiment.

In step S6 illustrated in FIG. 8, a water transfer rate V_liq in the reactant gas flow channel is respectively calculated for the anode side and the cathode side from the following expression. Respective water transfer rates V_liq in the hydrogen flow channel 25A and the air flow channel 25B are calculated in consideration of the fact that liquid water is blown away and discharged from inside the cell plane by the flow of reactant gas in the reactant gas flow channel.

$$V\_liq = k_3 \times V\_gas$$

In this case, the water transfer rate V_liq refers to a transfer rate of liquid water blown away by the reactant gas. In addition, V_gas denotes a water vapor flow rate in the reactant gas flow channel. A value calculated from a map related to a state quantity such as a supply flow rate of reactant gas and water vapor partial pressure is to be used. The coefficient $k_3$ represents a factor due to temperature or water repellency and attributable to properties of the reactant gas flow channel. The coefficient $k_3$ is to be mapped in advance from an experiment.

FIG. 13 is a diagram illustrating an example of a residual water content distribution in a cell plane calculated in steps S4 to S6. The residual water content distribution is determined by taking into consideration the variation of liquid water in the reactant gas flow channel (in other words, $V_{vap \to liq}$, $V_{liq \to vap}$, and V_liq calculated in steps S5 and S6 described above) in addition to the relative humidity distribution (FIG. 12) in the reactant gas flow channel calculated in step S4. As can be understood from FIG. 13, in the hydrogen flow channel 25A, the residual water content is higher on the side of the hydrogen outlet 27b than the side of the hydrogen inlet 27a, and in the air flow channel 25B, the residual water content gradually drops toward the side of the air outlet 28b. Moreover, although not diagrammatically illustrated, a moisture content distribution in a cell plane can be determined from the relative humidity distribution (FIG. 12) of the electrolyte membrane 23 calculated in step S4 and is to approximate the relative humidity distribution.

From the procedure described above, variations (water balance) in a residual water content and a moisture content of a single cell $2_i$ in a given calculation time can be calculated and a residual water content distribution of the hydrogen flow channel 25A, a residual water content distribution of the air flow channel 25B, and a moisture content distribution of the electrolyte membrane 23 can be determined. Water balance in a cell plane can be calculated based on a coarseness of a mesh with sensitivity (for example, the five meshes illustrated in FIG. 13). Accordingly, how much residual water content and moisture content exist in which portion can be estimated with high accuracy.

2. Consideration of Temperature Variation and Flow Distribution Variation in Cell Lamination Direction During Estimation $T_{IN,i}$, $T_{OUT,i}$, $P_{air,i}$, $P_{H2,i}$, $Q_{air,i}$, and $Q_{H2,i}$ of each single cell $2_i$ are to be determined as follows.

(1) Calculation of Cell Inlet Temperature $T_{IN,i}$

As illustrated in FIG. 14, first, a stack inlet temperature $T_{in}$, a coolant flow rate $Q_{LLC}$, an external air temperature $T_{external\ air}$, and a vehicle speed $V_{vehicle\ speed}$ are read (step S11). In this case, $T_{in}$ is a detected value by the temperature sensor T1. $Q_{LLC}$ is a flow rate of the coolant to be supplied to the fuel cell 1 and can be estimated from the number of revolutions of the cooling pump 50 and other detected values. Alternatively, a flow rate sensor may be provided at the coolant flow channel 51 and a detected value by the flow rate sensor may be used. $T_{external\ air}$ is a detected value by the external air temperature sensor 62 and $V_{vehicle\ speed}$ is a detected value by the vehicle speed sensor 63.

Generally, in the cell laminate 3, the further away from the supply port 14 of the reactant gas or, in other words, the greater the cell channel "i," the greater the heat discharge. In addition, the influence of heat discharge varies depending on the coolant flow rate, the external air temperature, and the vehicle speed. For example, as illustrated in FIG. 15A, the greater the coolant flow rate $Q_{LLC}$ ($Q_1 > Q_2$), the less the stack inlet temperature $T_{IN}$ is influenced by heat discharge. In other words, the cell inlet temperature $T_{IN,i}$ can be prevented from dropping below the stack inlet temperature $T_{IN}$. In addition, as illustrated in FIG. 15B, the higher the $T_{external\ air}$ ($T_{external\ air\ 1} > T_{external\ air\ 1}$), the less the stack inlet temperature $T_{IN}$ is influenced by heat discharge.

Therefore, in consideration of such declines in coolant temperature due to heat discharge, the cell inlet temperature $T_{IN,i}$ is to be calculated as a function expressed as follows (step S12).

$$T_{IN,i} = f(Q_{LLC}, T_{IN}, T_{external\ air}, V_{vehicle\ speed})$$

Accordingly, a cell inlet temperature $T_{IN,i}$ corresponding to the cell channel i can be calculated from the respective values of $Q_{LLC}$, $T_{IN}$, $T_{external\ air}$, and vehicle speed described above.

(2) Calculation of Air Flow Rate $Q_{air,i}$ and Air Back Pressure $P_{air,i}$

As illustrated in FIG. 16, first, an air flow rate $Q_{air}$, an air back pressure $P_{air}$, a stack inlet temperature $T_{IN}$, a stack outlet temperature $T_{OUT}$, and a current value I are read (step S21). In this case, the air flow rate $Q_{air}$, the air back pressure $P_{air}$, and the stack outlet temperature $T_{OUT}$ are respective detected values of the flow rate sensor F1, the pressure sensor P1, and the temperature sensor T2. In addition, in step S21, a gas density of air that flows into the manifold 15a is calculated as a function of the stack inlet temperature $T_{IN}$ and the air flow rate $Q_{air}$.

In the following step S22, a P-Q characteristic (a characteristic representing a relationship between air back pressure and air flow rate) of a single cell $2_i$ is determined based on the residual water content of the single cell $2_i$. For example, a map representing a P-Q characteristic (pressure-flow rate characteristic) corresponding to a plurality of residual water contents (x>y) such as that illustrated in FIG. 17 is to be acquired in advance, and a P-Q characteristic corresponding to an immediately previous residual water content (a total amount of the cathode-side residual water content of the single cell $2_i$) calculated by the flow illustrated in FIG. 8 is determined.

Next, a cell inlet pressure distribution, a cell inflow flow rate distribution, and a cell outlet pressure distribution are calculated from a map as functions of the air flow rate $Q_{air}$, the air back pressure $P_{air}$, the stack outlet temperature $T_{OUT}$, the gas density calculated above, and the P-Q characteristic of each single cell 2; (step S23). An example of the distributions are as illustrated in FIGS. 18A to 18C. In this case, since the cell inflow flow rate illustrated in FIG. 18B and the cell outlet pressure illustrated in FIG. 18C correspond to an air flow rate $Q_{air,i}$ and an air back pressure $P_{air,i}$ of the cell channel i, respective values thereof can be determined (step S24).

Moreover, although a detailed description will not be given, a hydrogen flow rate $Q_{H2,i}$ and a hydrogen pressure $P_{H2,i}$ of the single cell $2_i$ can also be calculated by the same method as used for the calculations of the air flow rate $Q_{air,i}$ and the air back pressure $P_{air,i}$. In this case, since the cell inlet pressure illustrated in FIG. 18A corresponds to the hydrogen pressure $P_{H2,i}$ and the cell inflow flow rate illustrated in FIG. 18B corresponds to the hydrogen flow rate $Q_{H2,i}$, respective values thereof can be determined.

(3) Calculation of Cell Outlet Temperature $T_{OUT,i}$

As illustrated in FIG. 19, first, a stack outlet temperature $T_{OUT}$ is read as a detected value of the temperature sensor T2 (step S31). In addition, a coolant flow rate $Q_{LLC}$, an external air temperature $T_{external\ air}$, and a vehicle speed $V_{vehicle\ speed}$ are read in the same manner as in the case of the stack inlet temperature $T_{IN}$ described above. Furthermore, a cell voltage $V_i$ and a current value I are read, and a heat generation amount $Q_{cell,i}$ each single cell $2_i$ is estimated from an I-V characteristic of each single cell $2_i$.

In this case, a voltage value of each single cell $2_i$ detected by a cell monitor, not illustrated, can be used as the cell voltage $V_i$. However, instead of using a sensor such as a cell monitor, the cell voltage $V_i$ can also be estimated by having each single cell $2_i$ retain an I-V map (dependent on an electric-generating capacity, an air flow rate, a hydrogen flow rate, an air back pressure, and a hydrogen pressure). Moreover, the heat generation amount $Q_{cell,i}$ is attributable to heat generation by $T\Delta S$ and heat loss due to overvoltage.

In the same manner as the stack inlet temperature $T_{IN}$ described above, the stack outlet temperature $T_{OUT}$ is also influenced by heat discharge depending on the position of the single cell $2_i$ in the cell laminate 3. For example, as illustrated in FIG. 20, the greater the coolant flow rate $Q_{LLC}$ ($Q_{LLC1} < Q_{LLC2}$), the less the stack outlet temperature $T_{OUT}$ is influenced by heat discharge.

Therefore, the coolant flow rate $Q_{LLC,i}$ and heat discharge are taken into consideration in addition to the heat generation amount $Q_{cell,i}$, and the cell outlet temperature $T_{OUT,i}$ is to be calculated as a function expressed as follows (step S32).

$$T_{OUT,i} = f(Q_{cell,i}, Q_{LLC,i}, T_{OUT}, T_{external\ air}, V_{vehicle\ speed})$$

Accordingly, a cell outlet temperature $T_{OUT,i}$ corresponding to the cell channel i can be calculated from respective detected values or estimated values represented by the parameters.

Moreover, $Q_{LLC,i}$ is a coolant flow rate to be supplied to each single cell 2 and takes into consideration a flow distribution variation with respect to the coolant flow rate $Q_{LLC}$ described earlier in a case where a single fuel cell stack 1 is assumed. More specifically, by creating in advance a map representing a relationship between the coolant flow rate $Q_{LLC}$ and the cell channel i for each of several coolant flow rates $Q_{LLC}$, a $Q_{LLC,i}$ corresponding to the cell channel i can be calculated.

According to the procedures (1) to (3) described above, values that take into consideration a temperature distribution (a variation in heat discharge or the like) and pressure drop distribution (flow distribution variations of oxidation gas, fuel gas, coolant, or the like) can be used for state quantities of each single cell $2_i$ in the flows (steps S1, S2, and S4) illustrated in FIG. 8. Accordingly, compared to a case where the fuel cell 1 is singularly perceived as a stack, a residual water content distribution and a moisture content distribution can be estimated with high accuracy for all single cells 2 (in other words, in a cell lamination direction).

D. Control Examples Using Estimation Results

Next, a plurality of control examples using results of estimation by the aforementioned estimation method will be described. According to the present embodiment, since highly accurate estimation results are to be used, appropriate control that takes water distribution into consideration can be performed at an appropriate timing and the entire fuel cell 1 can be operated in an optimum water content state. For example, a countermeasure control (discharge of water, wetting of electrolyte membrane) corresponding to a single cell in a most unfavorable state in the cell lamination direction can be performed. As a result, partial deterioration of the electrolyte membrane can be suppressed and a contribution can be made towards reducing auxiliary power loss due to excessive countermeasure control.

1. Cathode-side Water Reduction Control

FIG. 21 illustrates an example of a residual water content distribution on the cathode side in the cell lamination direction as estimated by the estimation method described above. FIG. 21 shows that residual water content is higher towards the end cell $2a$ and lower at a single cell 2 in a central part in the lamination direction (hereinafter referred to as a primary cell $2b$; refer to FIG. 9). The higher the residual water content of a portion, the more likely the flow of air as a reactant gas at the portion is to be inhibited, resulting in a greater pressure drop. Therefore, estimation of a pressure drop distribution in the cell lamination direction based on the residual water content distribution illustrated in FIG. 21 produces a result such as that illustrated in FIG. 22. Cell pressure drop as denoted in FIG. 22 refers to a pressure drop in the air flow channel 25B.

FIG. 23 is a diagram illustrating a relationship between cell pressure drop and residual water content. A line $L_1$ denoted in FIG. 23 represents a characteristic of a single cell 2 obtained in advance through evaluation. Values related to the end cell $2a$ and the primary cell $2b$ determined from the residual water content distribution illustrated in FIG. 21 and the pressure drop distribution illustrated in FIG. 22 are plotted on the line $L_1$. Moreover, values related to a plurality of single cells 2 existing between the end cell $2a$ and the primary cell $2b$ are to be plotted at a portion of the line $L_1$ between the two plots.

In a case where a rapid output increase request is issued such as during a WOT (Wide Open Throttle: a full opening of a throttle valve) in a vehicle-mounted state of the fuel cell system 100, there is a risk of insufficient stoichiometry and deterioration at a single cell 2 whose cell pressure drop value exceeds $P_{limit}$. Therefore, with a single cell 2 that exceeds $P_{limit}$, an operation must be performed to reduce internal residual water content such that the cell pressure drop of the end cell $2a$ falls below $P_{limit}$.

FIG. 24 is a diagram illustrating a relationship between reactant gas flow rate and cell pressure drop. FIG. 24 replaces the relationship with residual water content illustrated in FIG. 23 with a relationship with flow rate. A line $L_2$ denoted in FIG. 24 represents a characteristic of a single cell 2 obtained in advance through evaluation. Values related to cell pressure drop of the end cell $2a$ and the primary cell $2b$ determined from the pressure drop distribution illustrated in FIG. 22 are plotted on the line $L_2$. Similarly, values related to a plurality of single cells 2 existing between the end cell $2a$ and the primary cell $2b$ are to be plotted at a portion of the line $L_2$ between the two plots.

In order to fulfill necessary stoichiometry during WOT and the like, a flow rate $Q_{min}$ is required as a flow rate of reactant gas to each single cell 2. In other words, there is a risk of insufficient stoichiometry and deterioration during WOT at a single cell 2 that falls below the flow rate $Q_{min}$ on the line $L_2$ illustrated in FIG. 24. Therefore, with a single cell 2 that falls below the flow rate $Q_{min}$, an operation must be performed to reduce internal residual water content so that a necessary flow rate can be secured during WOT.

An operation for reducing residual water content is to be executed under an instruction from the operation control unit 68 and can be performed by varying a state quantity of oxidation gas to the fuel cell 1. Representative operation methods include (1) increasing air supply flow rate and (2) reducing air back pressure. Moreover, these methods may be executed individually or in combination with each other.

(1) Increasing Air Supply Flow Rate

The air supply flow rate can be increased or reduced by the compressor 33. As such, during an operation for reducing residual water content, the number of revolutions of the compressor 33 is increased so that the supply flow rate of air to the fuel cell 1 becomes greater than that during normal operation (an operation that is not an operation for reducing residual water content). Accordingly, residual water in the single cell 2 can be forcibly discharged with air. On the other hand, during an operation for reducing residual water content, the operation is desirably controlled so that the single cell 2 with the lowest residual water content (in this case, the primary cell 2b) does not become excessively dry.

FIG. 25 is a timing chart illustrating an example of a method of reducing residual water content in the end cell 2a so that the primary cell 2b does not become excessively dry. A residual water content $W_1$ denoted in FIG. 25 represents a residual water content at which the electrolyte membrane 23 of the primary cell 2b is at an optimum wetting state. When the residual water content falls below $W_1$, the electrolyte membrane 23 of the primary cell 2b becomes somewhat drier. In addition, a residual water content $W_2$ represents a maximum residual water content at which a necessary air supply flow rate can be secured during WOT. When the residual water content exceeds $W_2$, cell pressure drop becomes greater than $P_{limit}$ illustrated in FIG. 23. In the present method, a lower limit of the residual water content of the primary cell 2b is set as the residual water content $W_1$ and an upper limit of the residual water content of the end cell 2a is set as the residual water content $W_2$, whereby air supply flow rate is controlled so that residual water content remains within this range.

More specifically, normal operation at an air supply flow rate $Q_1$ that is a constant base flow rate is performed until time $t_1$. In this case, since a power-generating reaction occurs at each single cell 2 and water is generated, the residual water contents of the primary cell 2b and the end cell 2a gradually increase. When the residual water content of the end cell 2a reaches the residual water content $W_2$ at time $t_1$, the air supply flow rate is increased to $Q_2$. As a result, since a removal amount of liquid water by air increases, the residual water contents of the end cell 2a and the primary cell 2b are reduced. On the other hand, when the residual water content of the primary cell 2b reaches the residual water content $W_1$ at time $t_2$, the air supply flow rate is restored to $Q_1$. In other words, the operation for reducing residual water content is suspended and operation is switched to normal operation. Subsequently, in the same manner as the control from time $t_1$ to $t_2$, control is executed so that residual water content remains within a certain range.

By executing such water reduction control, the cathode-side residual water content in all single cells 2 of the fuel cell 1 can be optimized. Consequently, drying (partial deterioration) of the electrolyte membrane 23 due to excessive water discharge, current crowding, and auxiliary power loss can be avoided. Moreover, a value of the air supply flow rate $Q_2$ may be determined by an NV evaluation. In addition, in a case where liquid water discharge by increasing the air supply flow rate is not significantly effective due to characteristics of the single cell 2 and the like, liquid water is favorably gradually discharged by setting the base flow rate $Q_1$ to a large value. Furthermore, when controlling the air supply flow rate, a lower limit of the moisture content of the primary cell 2b may be considered instead of a lower limit of the residual water content of the primary cell 2b. In other words, the control of the air supply flow rate described above is performed and the operation for reducing residual water content is suspended so that the moisture content of the primary cell 2b exceeds a predetermined lower limit (for example, a value at which the electrolyte membrane 23 of the primary cell 2b does not become somewhat dry).

(2) Reducing Air Back Pressure

The air back pressure of the single cell 2 can be adjusted by the back pressure valve 34. As such, during an operation for reducing residual water content, an opening of the back pressure valve 34 is widened so that the air back pressure of the fuel cell 1 becomes lower than during normal operation. Accordingly, a volumetric flow rate of air increases, residual water in the single cell 2 can be forcibly discharged by air, and the cathode-side residual water content in the single cell 2 can be reduced. In this case, in the same manner as in "(1) Increasing air supply flow rate" described earlier, a lower limit of the residual water content of the primary cell 2b is to be set as the residual water content $W_1$ and an upper limit of the residual water content of the end cell 2a is to be set as the residual water content $W_2$, whereby air back pressure is to be controlled so that residual water content remains within this range. A detailed description of the present control will be omitted.

2. Anode-side Water Reduction Control

Since a distribution of the anode-side residual water content in the cell lamination direction can also be estimated, in a case where the residual water content is high, an operation for reducing residual water content is executed in the same manner as in "1. Cathode-side water reduction control" described earlier. Moreover, the anode side may also assume the same states as the cathode-side states illustrated in FIGS. 21 to 24.

Methods of operation for reducing the anode-side residual water content include a method in which the number of revolutions of the hydrogen pump 46 is increased compared to during normal operation. According to this method, the anode-side residual water content in the single cell 2 can be reduced. In this case, in the same manner as in "(1) Increasing air supply flow rate" described earlier, a lower limit of the residual water content of the primary cell 2b is to be set as the residual water content $W_1$ and an upper limit of the residual water content of the end cell 2a is to be set as the residual water content $W_2$, whereby the number of revolutions of the hydrogen pump 46 is to be controlled so that residual water content remains within this range.

3. Equalization Control of Temperature Distribution

As described above, due to a variation in heat discharge, the temperature distribution of the cell laminate 3 in the cell lamination direction is not constant. Generally, the temperature of the end cell 2a tends to drop the most. When water vapor condenses inside the end cell 2a due to the decrease in temperature, residual water content increases. As described above, when the residual water content exceeds a given upper limit (in the aforementioned example, the residual water content $W_2$), insufficient stoichiometry occurs during WOT. Therefore, in a case where it is estimated that the residual water content of the end cell 2a has increased due to a decrease in temperature, a control is preferably performed so as to equalize the temperature distribution of the cell laminate 3 in the cell lamination direction.

As illustrated in FIG. 26, first, a judgment is made as to whether or not a residual water content in the end cell 2a (an anode-side residual water content, a cathode-side residual water content, or a total amount thereof) exceeds a threshold (for example, $W_2$) (step S41). If not (No in step S41), the present control flow is exited. On the other hand, if the threshold is exceeded (Yes in step S41), equalization of the temperature distribution in the cell lamination direction is performed by controlling the coolant piping system 500 (step S42). More specifically, the switching valve 54 is switched to the side of the bypass flow channel 53 (for example, the opening of the rotary valve is set so as to be fully-opened to the side of the bypass) to supply the coolant heated by exhaust heat accompanying an electrochemical reaction of the fuel cell 1 to the fuel cell 1 without discharging heat from the radiator 52. In doing so, the number of revolutions of the cooling pump 50 may be increased. Accordingly, the temperature of the fuel cell 1 including the end cell 2b begins to rise actively.

Subsequently, once it is confirmed that temperature distribution has been equalized or the residual water content in the end cell 2a has fallen below the threshold, the control of the coolant piping system 500 is restored to the original state. Moreover, a confirmation of whether or not temperature distribution has been equalized can be performed by, for example, calculating a cell outlet temperature $T_{OUT,i}$ by the method described earlier. In addition, a confirmation of whether or not the residual water content in the end cell 2a has fallen below the threshold can be performed using the method of estimating a residual water content distribution which takes into consideration the water transfer rate $V_{H2O,CA \rightarrow AN}$ described earlier.

According to such a control example, since the temperature distribution of the cell laminate 3 is equalized in the cell lamination direction, a variation in cell pressure drop can also be equalized and deterioration of the end cell 2a due to insufficient stoichiometry during WOT and the like can be avoided.

Moreover, "1. Cathode-side water reduction control," "2. Anode-side water reduction control," and "3. Equalization control of temperature distribution" described above can be executed in combination with each other.

4. Equalization Control of Residual Water Content in Single Cell

In some cases, as a result of the estimation of residual water content distribution in a cell plane described above, a high residual water content is estimated to be locally retained in an arbitrary single cell 2 of the cell laminate 3. In such cases, a control is preferably performed in the cell plane of the single cell 2 so as to equalize the residual water content.

As illustrated in FIG. 27, first, a judgment is made on whether or not a residual water content at least one arbitrary position in the hydrogen flow channel 25A and the air flow channel 25B of one or all single cells 2 has exceeded a threshold (step S51). If not (No in step S51) or, in other words, if a high residual water content is not retained locally, the present control flow is exited. The threshold can be arbitrarily set by experiment or the like and is set, for example, to a residual water content that enables a necessary reactant gas flow rate to be secured during WOT.

In a case where a high residual water content is retained locally (Yes in step S51), processing for increasing water circulation within the cell plane is performed (step S52). For example, the number of revolutions of the hydrogen pump 46 or the compressor 33 is increased. The former processing is effective in a case where residual water is retained at a portion of the hydrogen flow channel 25A while the latter processing is effective in a case where residual water is retained at a portion of the air flow channel 25B. Since water transfer between electrodes is taken into consideration, countermeasure control with an added counterflow effect can be performed. As another processing for improving water circulation, a state quantity of air or hydrogen gas to the fuel cell 1 can be varied by adjusting the opening of the back pressure valve 34 or the opening of the injector 45.

As shown, by performing processing that takes into consideration a residual water content distribution in a cell plane, the circulation of water in the cell plane can be promoted and the residual water content in the cell plane can be equalized.

Performing such equalization enables auxiliary loss to be reduced and the fuel cell 1 to be operated at an optimum state. Confirmation of whether or not the residual water content in the cell plane has been equalized can be performed by once again estimating the residual water content distribution in the cell plane described above.

5. Drying Suppression Control of Electrolyte Membrane

In some cases, as a result of the estimation of residual water content distribution in the electrolyte membrane 23 described above, a low residual water content is estimated for the entire electrolyte membrane 23 or a part of the electrolyte membrane 23 at an arbitrary single cell 2 of the cell laminate 3. As described above, a low moisture content leads to drying of the electrolyte membrane 23. When the electrolyte membrane 23 dries, resistance overvoltage increases and the performance of the single cell 2 deteriorates. Thus, in such cases, control for suppressing drying of the electrolyte membrane 23 is to be performed.

As illustrated in FIG. 28, first, using the fact that the moisture content of the electrolyte membrane 23 has already been estimated in the cell lamination direction and in the cell plane by the method of estimating moisture content distribution described above, a judgment is made on whether or not a moisture content at an arbitrary position exceeds a threshold (step S61). In this case, the moisture content at an arbitrary position includes at least two moisture contents, namely, a total moisture content in the cell plane of each electrolyte membrane 23 and a moisture content at an arbitrary position in the cell plane of each electrolyte membrane 23. In a case where the judgment results in the moisture content at the arbitrary position exceeding the threshold (No in step S61), the present control flow is exited. The threshold can be arbitrarily set by experiment or the like and can be set to, for example, a moisture content that presents a risk of dry up.

In a case where the moisture content is under the threshold (Yes in step S61) or, in other words, in a case where there is a risk of dry up of the electrolyte membrane 23, drying prevention processing of the electrolyte membrane 23 is performed by varying the state quantity of the reactant gas (step S62). For example, at least one of reducing the air supply flow rate by the compressor 33, increasing the air back pressure by the back pressure valve 34, and reducing the hydrogen supply flow rate by the hydrogen pump 46 or the injector 45 is to be performed.

Such processing enables operations to be performed with the electrolyte membrane 23 in an optimum moisture condition and an improvement in fuel efficiency due to prevention of deterioration by drying and an I-V optimizing operation. Moreover, confirmation of whether or not there is no longer a risk of the electrolyte membrane 23 drying up can be performed by once again estimating the moisture content distribution described above.

6. Cell Voltage Reduction Prevention Control

In a case where the residual water content on the anode side is high, there is a risk that cell voltage may drop during WOT. Therefore, the following is preferably performed as control for preventing a reduction in cell voltage.

As illustrated in FIG. 29, first, a prediction is made on whether or not there is a risk of cell voltage reduction due to WOT based on the residual water content (residual water content as a total amount or a localized residual water content) of the hydrogen flow channel 25A estimated according to the estimation method described above (step S71). For example, a judgment is made on whether or not the estimated residual water content of the hydrogen flow channel 25A is to exceed a threshold (example: a residual water content that causes cell voltage reduction during WOT) determined in advance by experiment or the like. In a case where it is predicted that there is no risk of cell voltage reduction (No in step S71), the present control flow is exited.

In a case where it is predicted that there is a risk of cell voltage reduction (Yes in step S71), processing for increasing hydrogen concentration (fuel concentration) in the hydrogen recirculation system is executed while taking into consideration a deterioration in flow distribution attributable to an increase in pressure drop caused by the residual water content (step S72). For example, the injector 45 is controlled to increase the hydrogen supply flow rate to the fuel cell 1 and secure necessary hydrogen stoichiometry. Alternatively, the opening/closing frequency of the purge valve 48 is increased and hydrogen off-gas including impurities is actively discharged in order to increase the hydrogen concentration in the hydrogen recirculation system. Needless to say, the controls of the injector 45 and the purge valve 48 can be executed together. In this case, the hydrogen recirculation system is made up of the circulatory flow channel 42 and a portion of the supply flow channel 41 which is on the downstream-side of the confluence A.

Such processing enables the frequency of oxidation of the electrodes (the anode electrode 24A, the cathode electrode 24B) of the single cell 2 due to hydrogen deficiency. Accordingly, the durability of the single cell 2 can be improved. Moreover, confirmation of whether or not there is no longer a risk of cell voltage reduction can be performed by once again estimating the residual water content distribution described above.

BRIEF DESCRIPTION OF THE DRAWINGS

FIG. 6 is a configuration diagram of a fuel cell system according to the embodiment;

FIG. 29 is a flow chart illustrating a processing flow of cell voltage reduction prevention control according to the embodiment.

DESCRIPTION OF SYMBOLS

Figure 1:
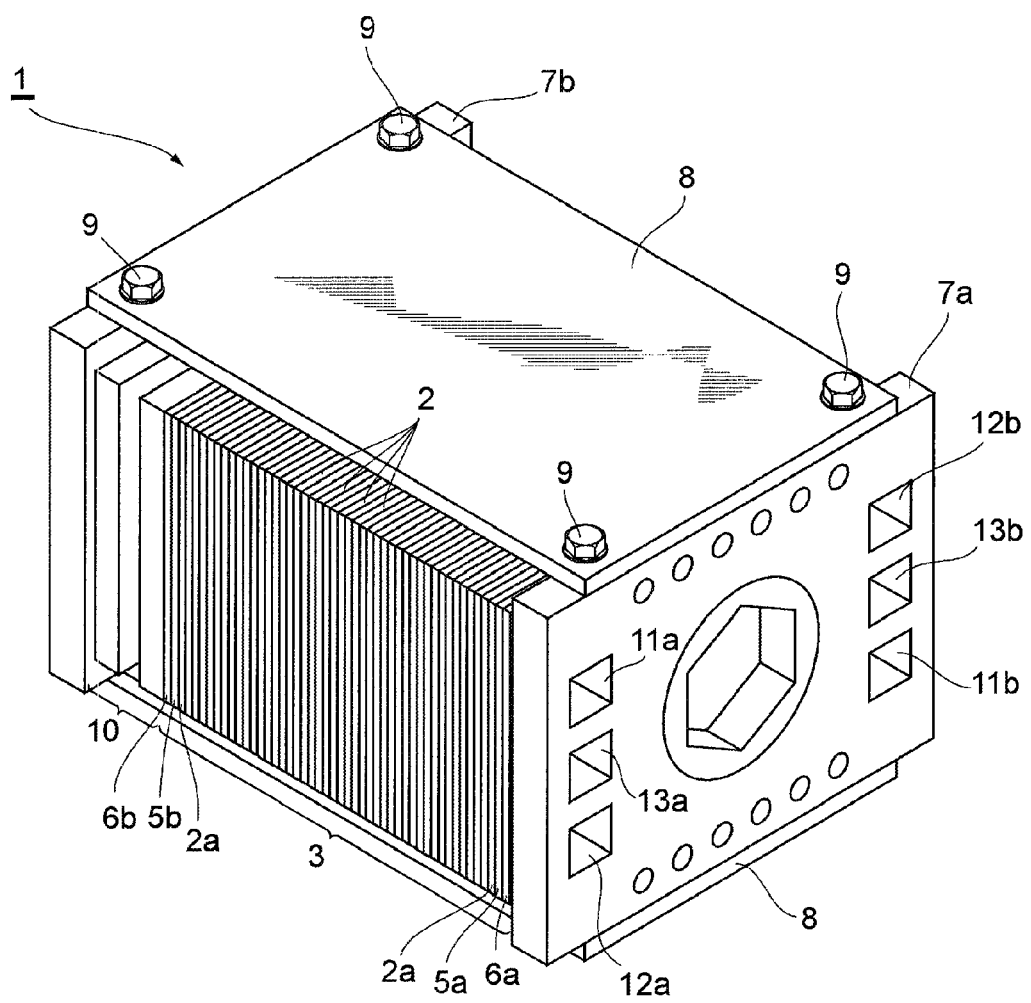
FIG. 1 is a perspective view of a fuel cell according to an embodiment.
Figure 2:
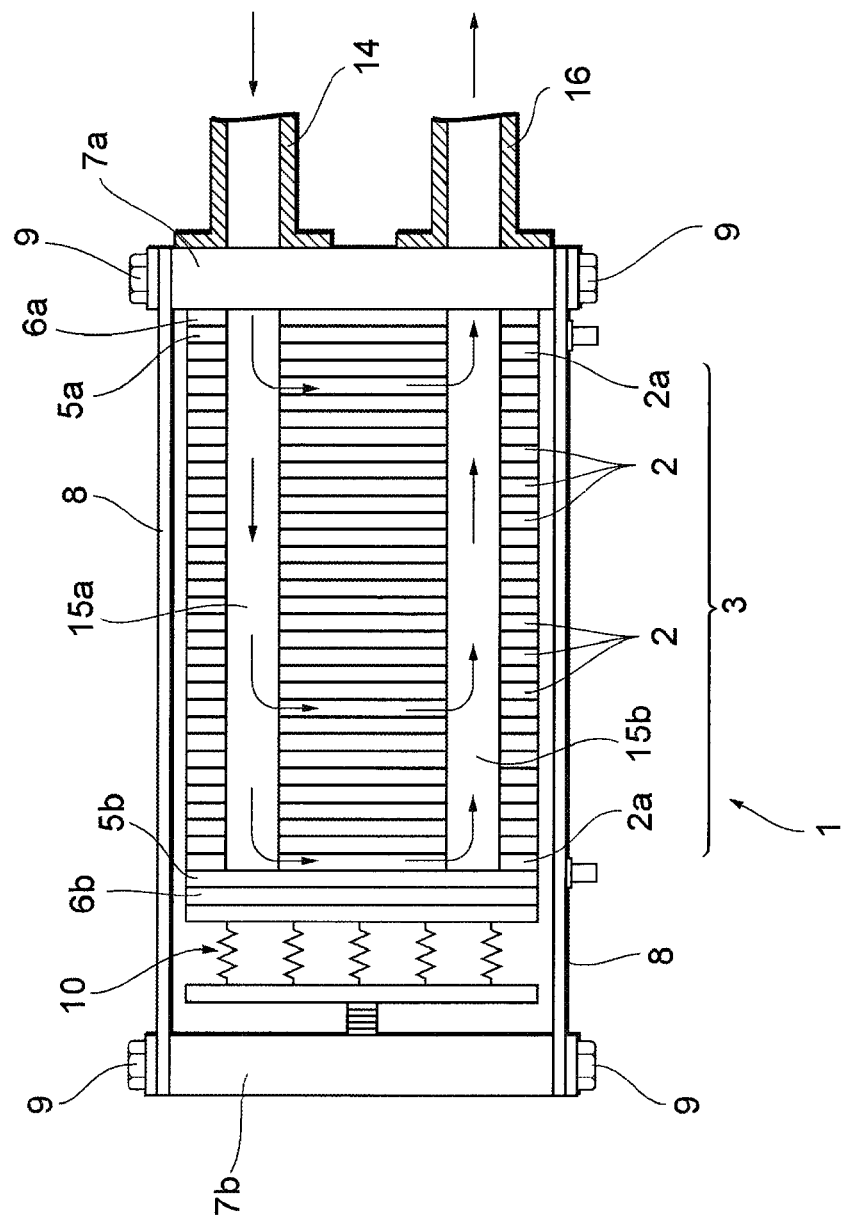
FIG. 2 is a side view of a part of an interior of the fuel cell according to the embodiment.
Figure 3:
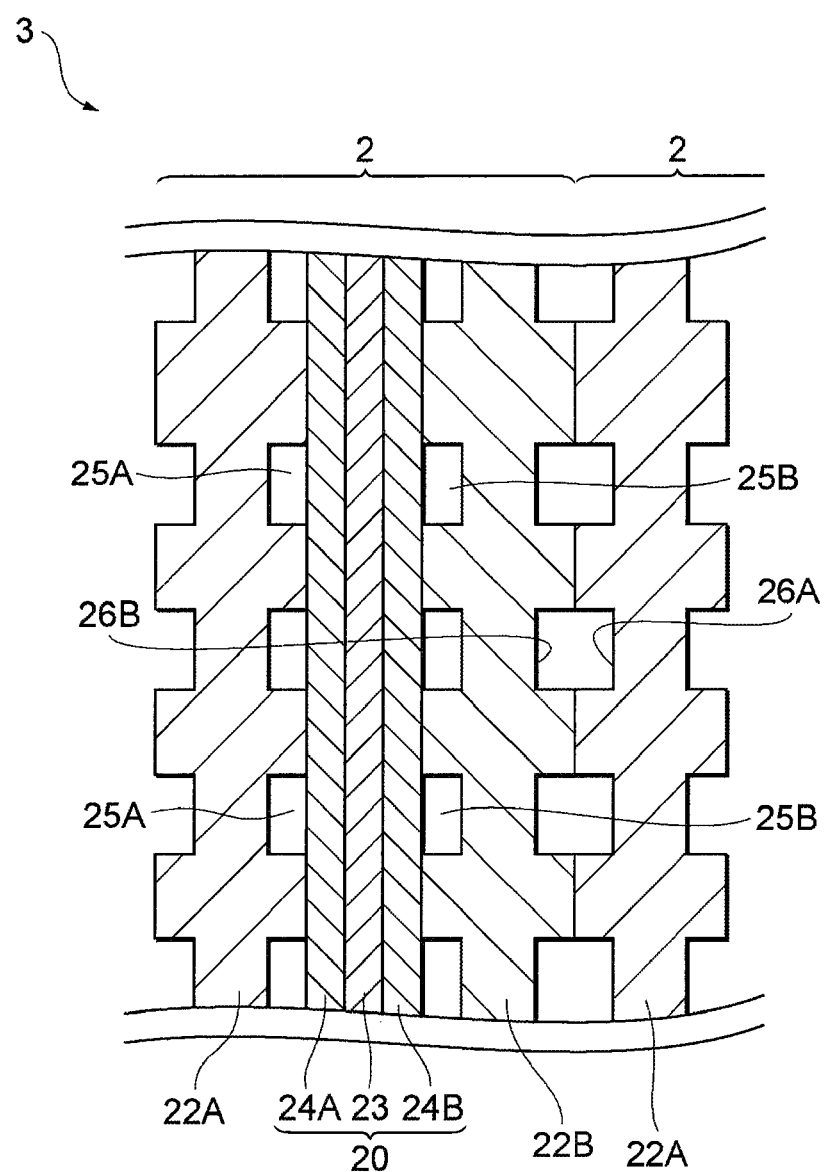
FIG. 3 is a cross-sectional view of a single cell according to the embodiment.
Figure 4:
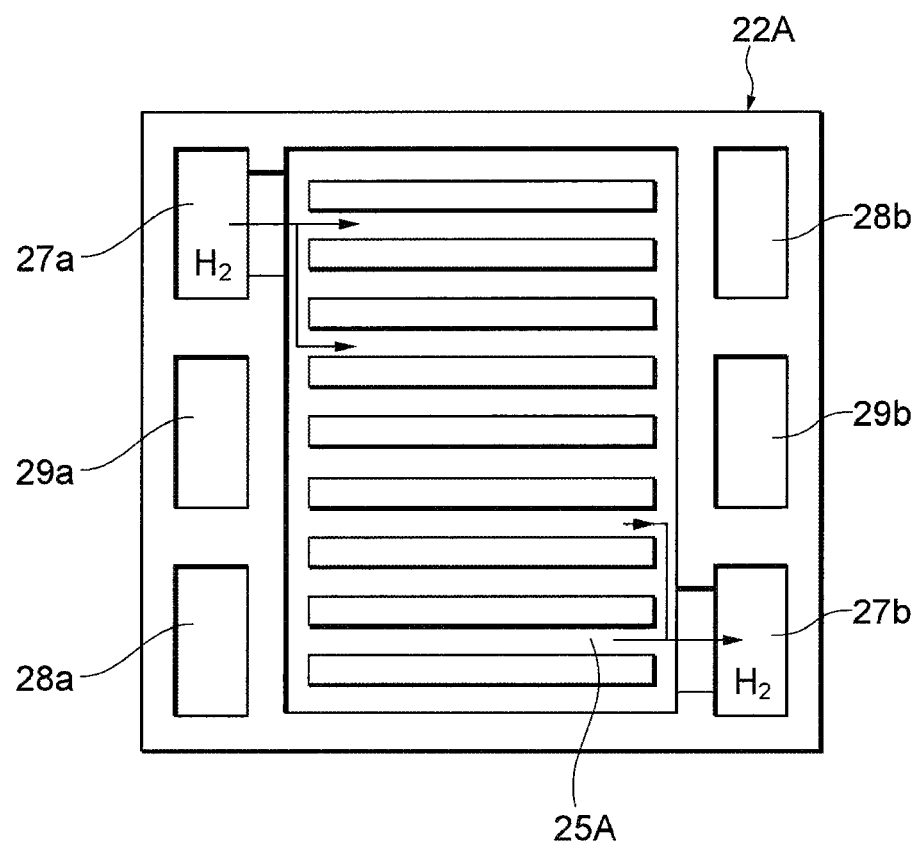
FIG. 4 is a plan view of a separator according to the embodiment.
Figure 5A:
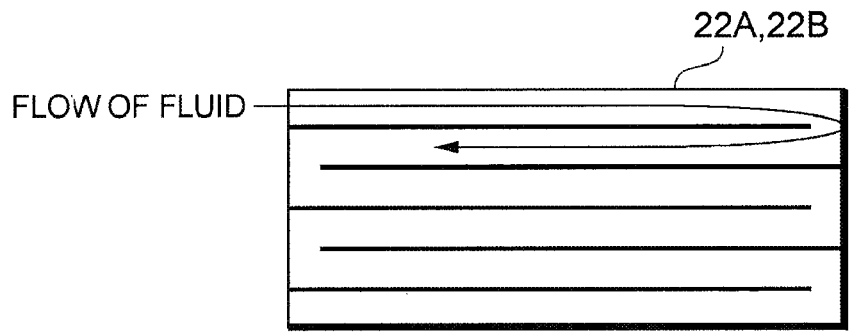
FIG. 5A is a schematic plan view illustrating a flow channel geometry of a separator according to a first modification of the embodiment.
Figure 5B:
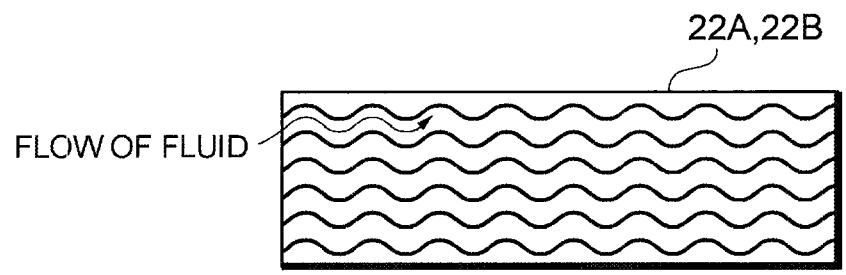
FIG. 5B is a schematic plan view illustrating a flow channel geometry of a separator according to a second modification of the embodiment.
Figure 5C:
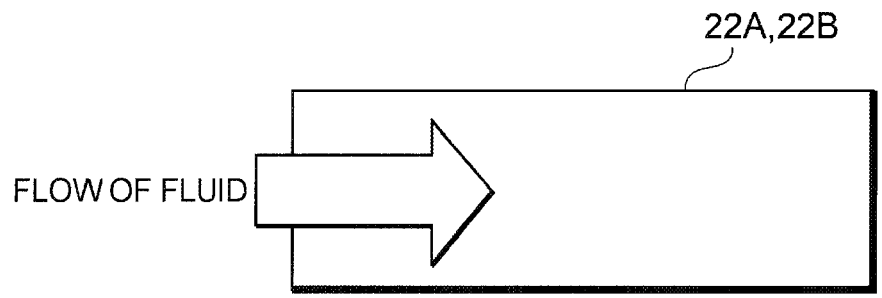
FIG. 5C is a schematic plan view illustrating a flow channel geometry of a separator according to a third modification of the embodiment.
Figure 7:
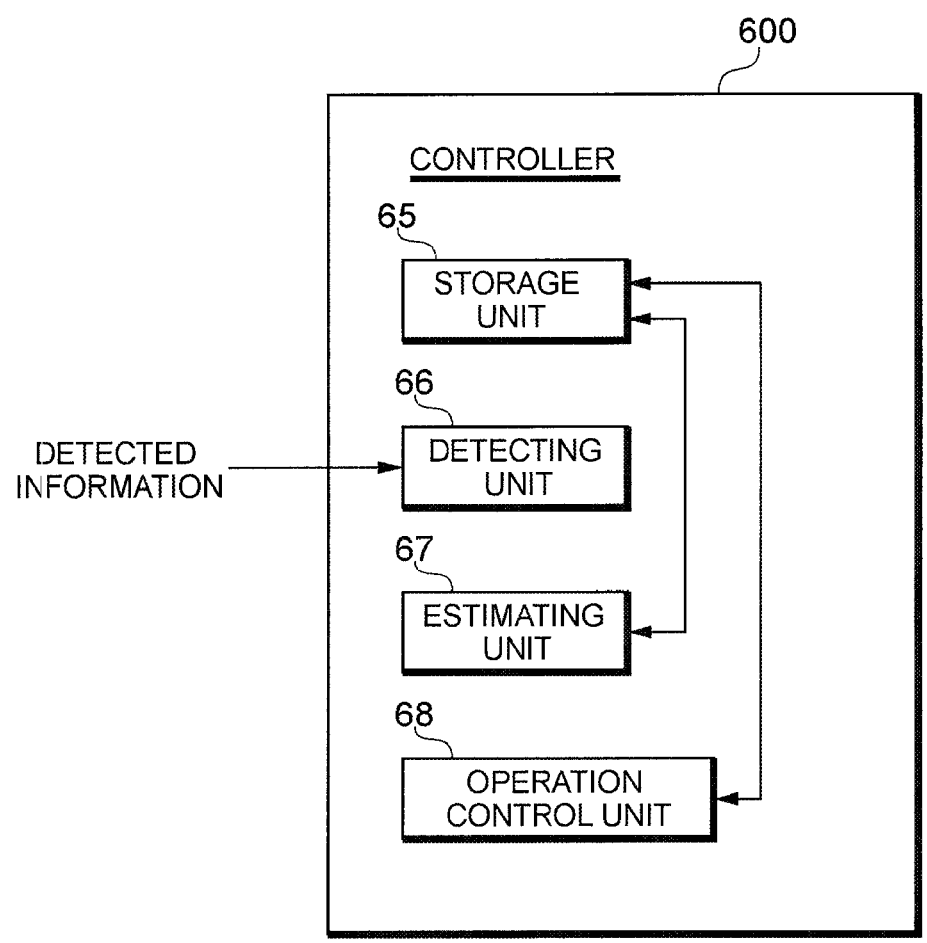
FIG. 7 is a functional block diagram of a controller according to the embodiment.
Figure 8:
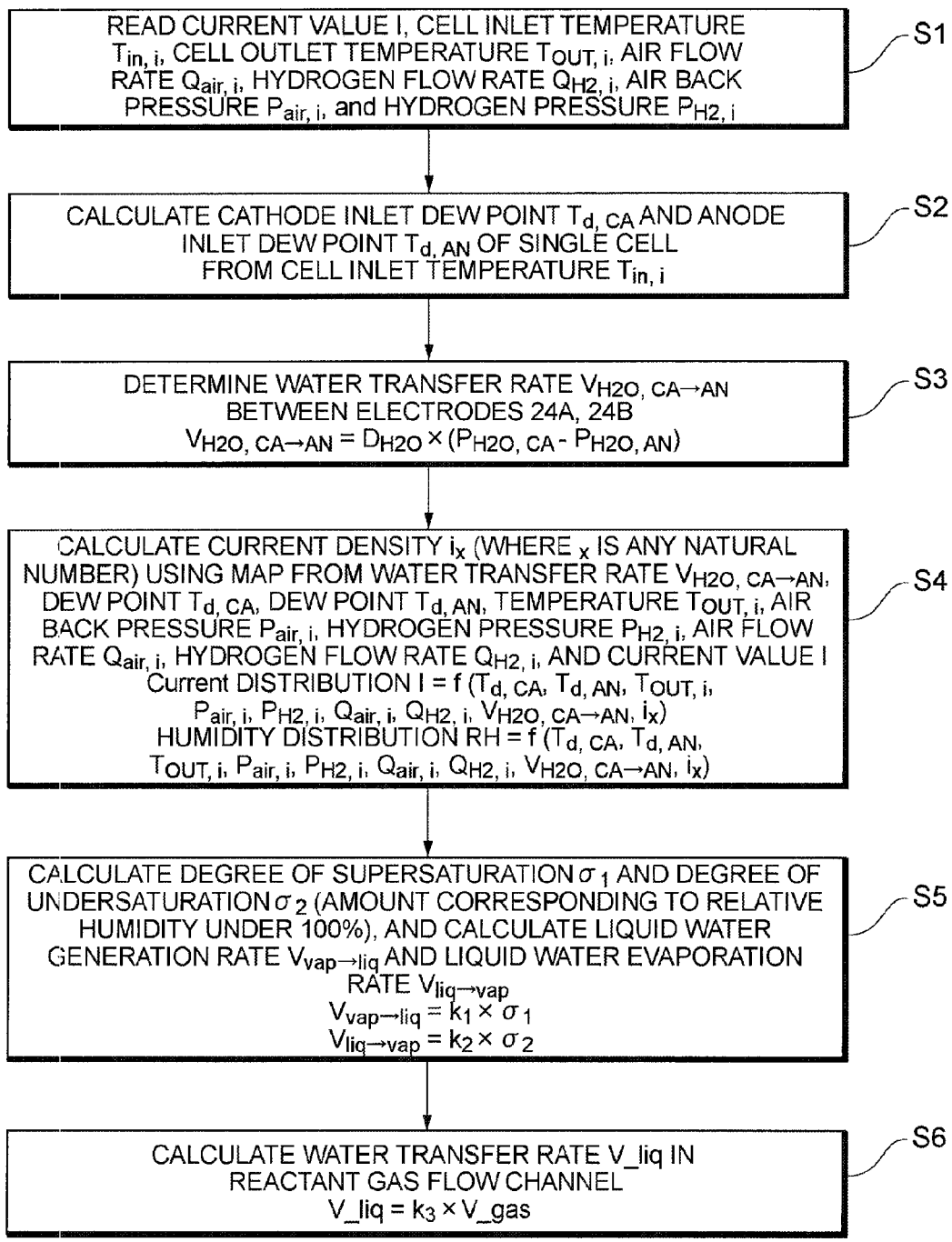
FIG. 8 is a flow chart illustrating a method of estimating water distribution in a cell plane according to the embodiment.
Figure 9:
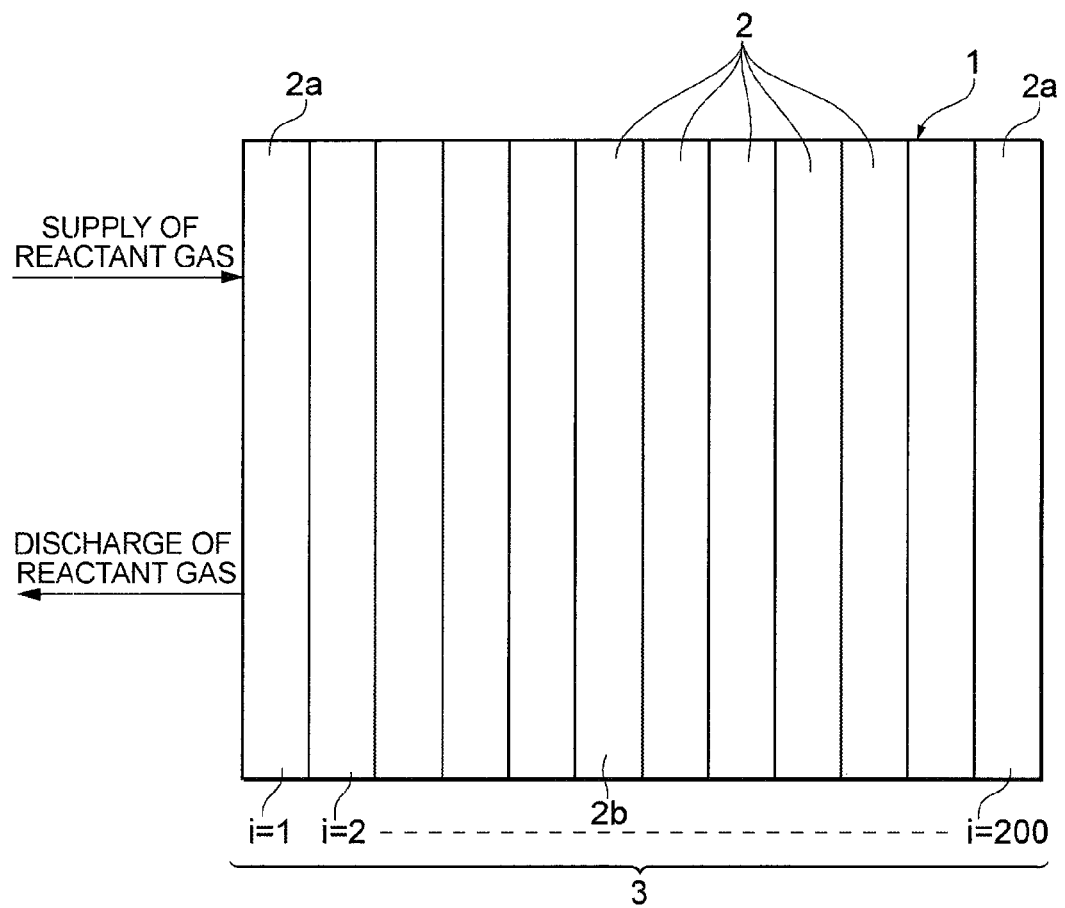
FIG. 9 is a diagram illustrating a relationship between supply and discharge of a reactant gas and a cell channel with respect to a cell laminate according to the embodiment.
Figure 10:
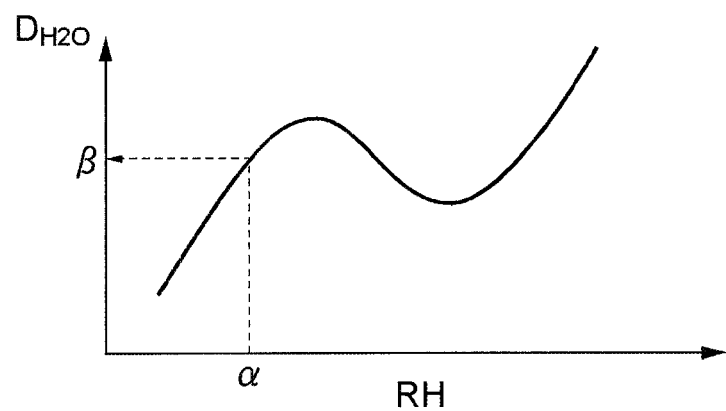
FIG. 10 is a characteristic map representing a relationship between relative humidity of an electrolyte membrane and $D_{H_2O}$ according to the embodiment.
Figure 11:
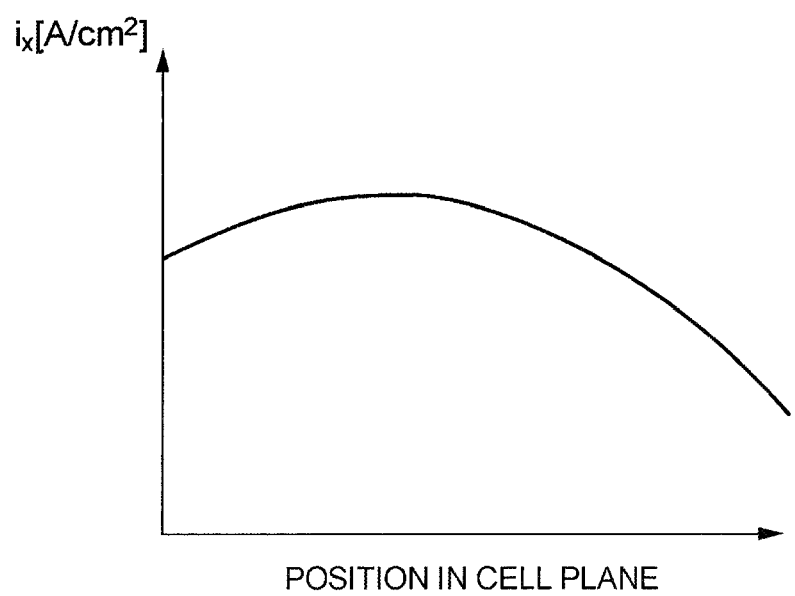
FIG. 11 is a diagram illustrating current density with respect to positions in a cell plane according to the embodiment.
Figure 12:
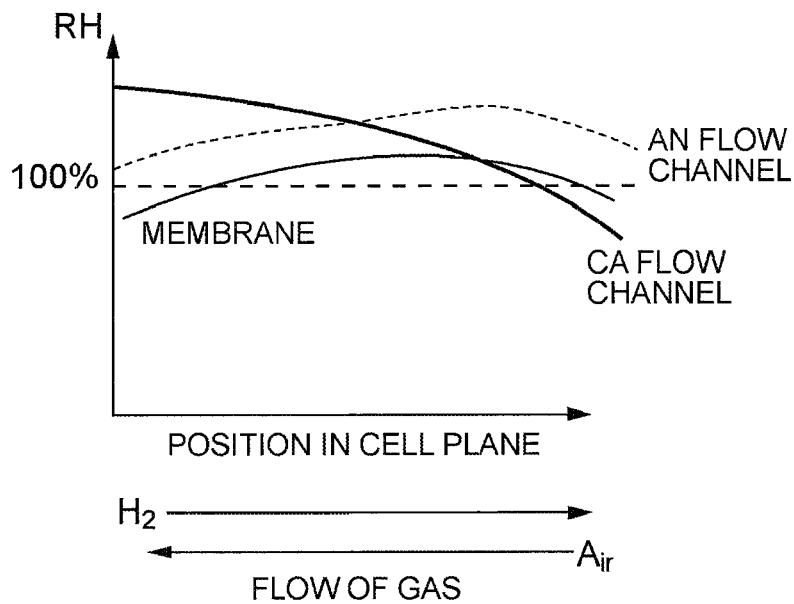
FIG. 12 is a diagram illustrating relative humidity distributions of a reactant gas flow channel and the electrolyte membrane in a cell plane according to the embodiment.
Figure 13:
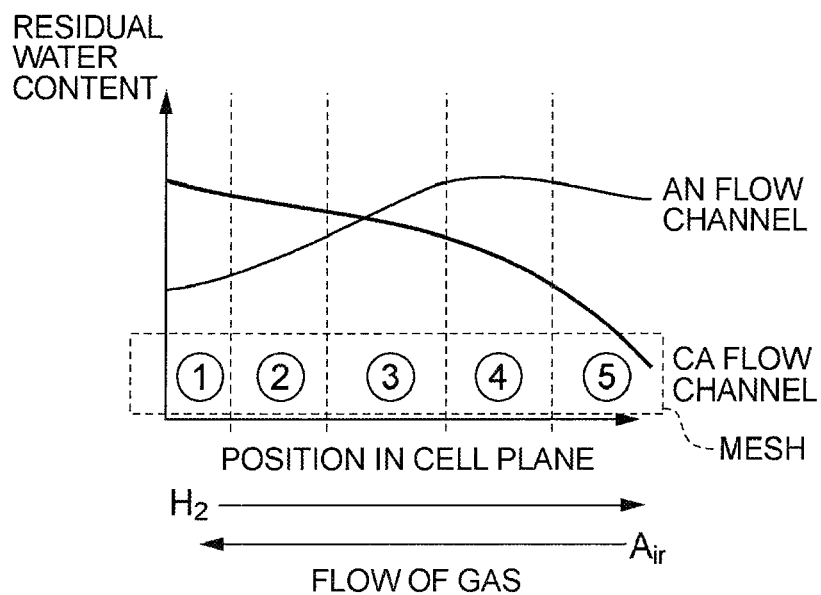
FIG. 13 is a diagram illustrating a residual water content distribution in a cell plane according to the embodiment.
Figure 14:
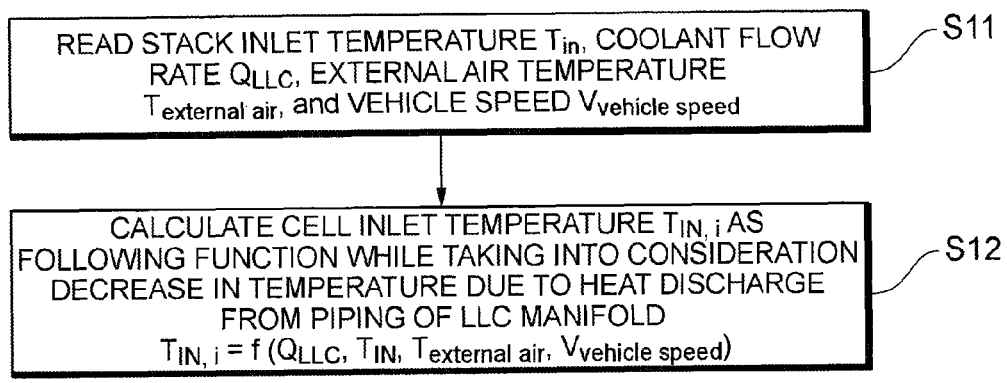
FIG. 14 is a flow chart illustrating a method of calculating a cell inlet temperature according to the embodiment.
Figure 15A:
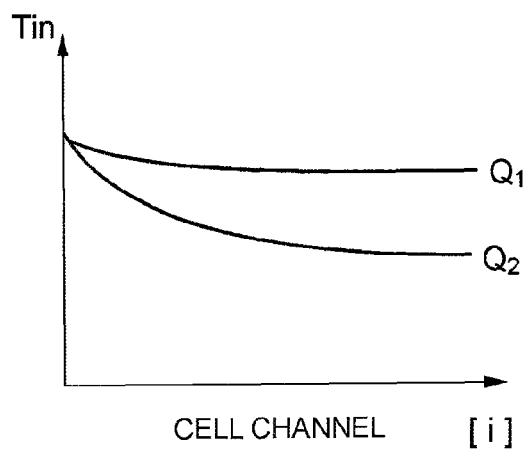
FIG. 15A is a diagram illustrating a relationship between single cell position and coolant flow rate with respect to the influence of heat discharge on a stack inlet temperature according to the embodiment.
Figure 15B:
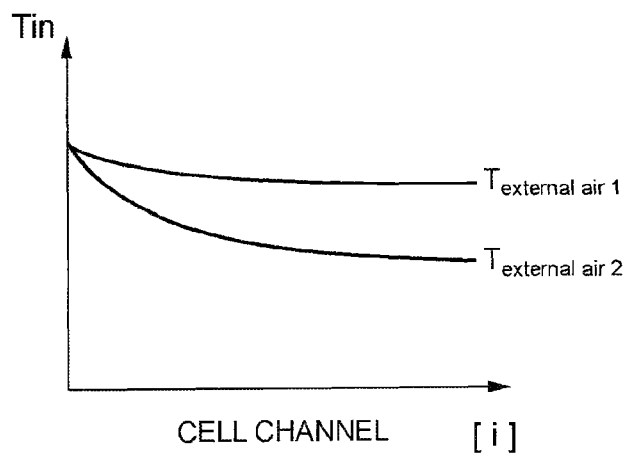
FIG. 15B is a diagram illustrating a relationship between single cell position and external air temperature with respect to the influence of heat discharge on the stack inlet temperature according to the embodiment.
Figure 16:
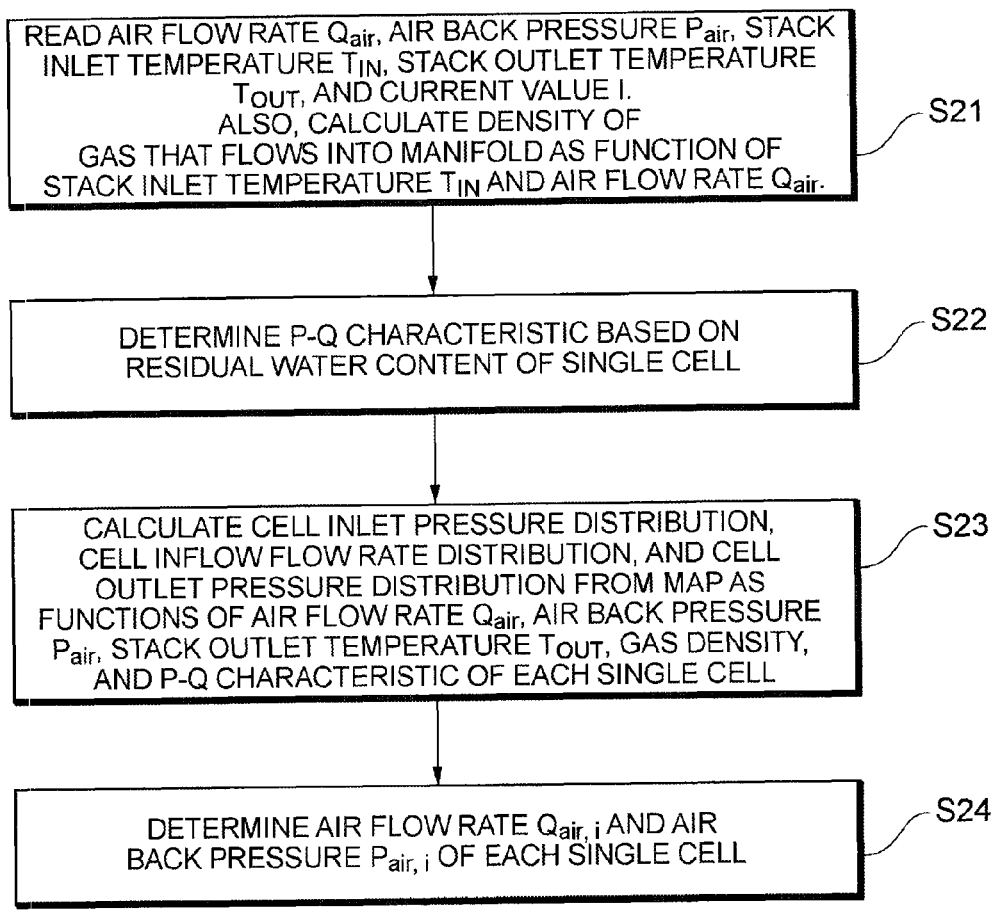
FIG. 16 is a flow chart illustrating a method of calculating an air flow rate and an air back pressure for each single cell according to the embodiment.
Figure 17:
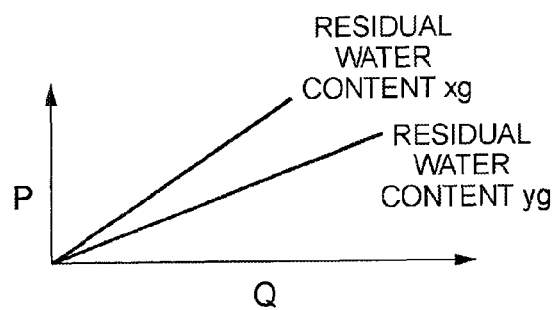
FIG. 17 is a map illustrating a P-Q characteristic of a single cell corresponding to a residual water content according to the embodiment.
Figure 18A:
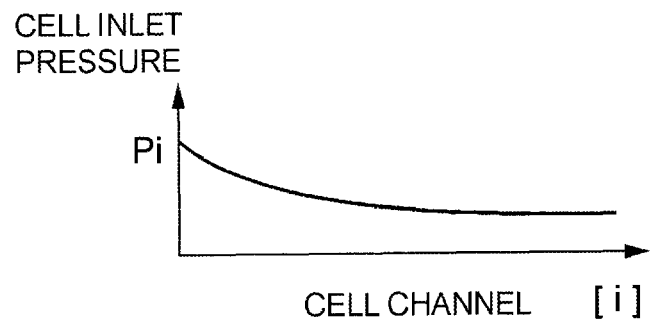
FIG. 18A is a diagram illustrating a cell inlet pressure distribution according to the embodiment.
Figure 18B:
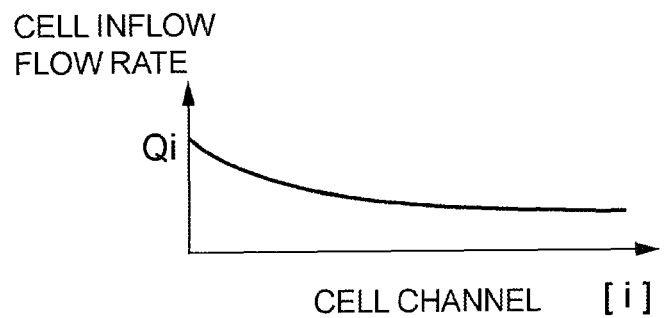
FIG. 18B is a diagram illustrating a cell inflow flow rate distribution according to the embodiment.
Figure 18C:
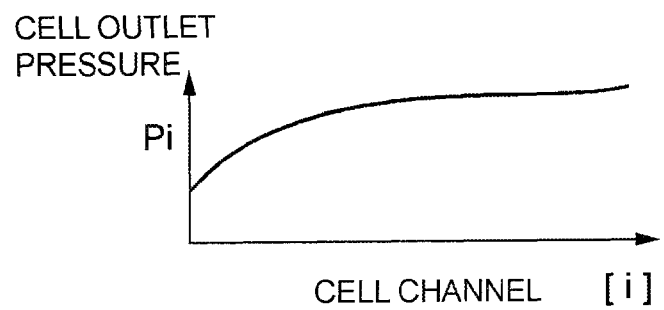
FIG. 18C is a diagram illustrating a cell outlet pressure distribution according to the embodiment.
Figure 19:
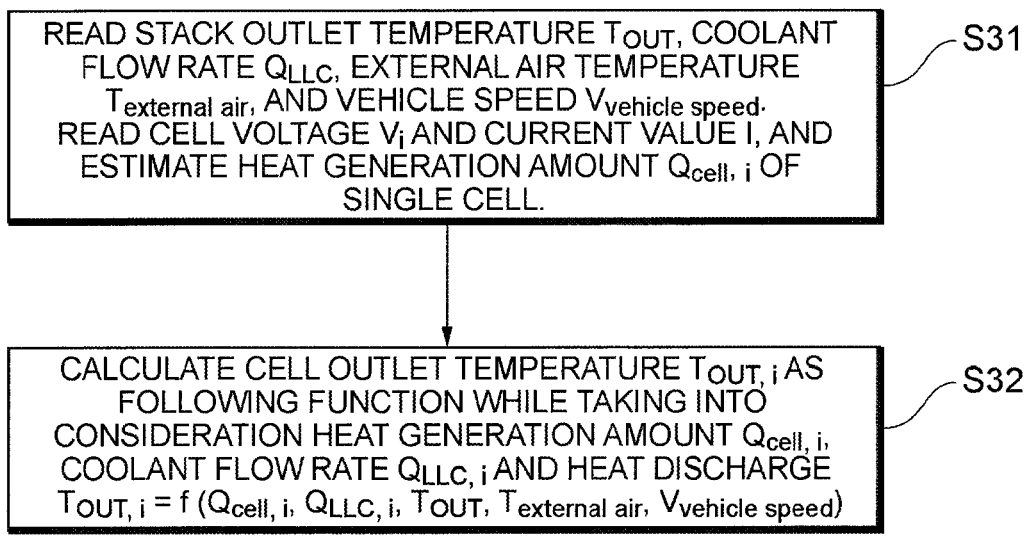
FIG. 19 is a flow chart illustrating a method of calculating a cell outlet temperature according to the embodiment.
Figure 20:
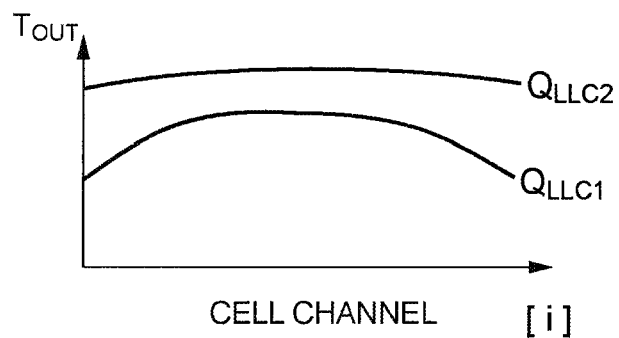
FIG. 20 is a diagram illustrating a relationship between single cell position and coolant flow rate with respect to the influence of heat discharge on a stack outlet temperature according to the embodiment.
Figure 21:
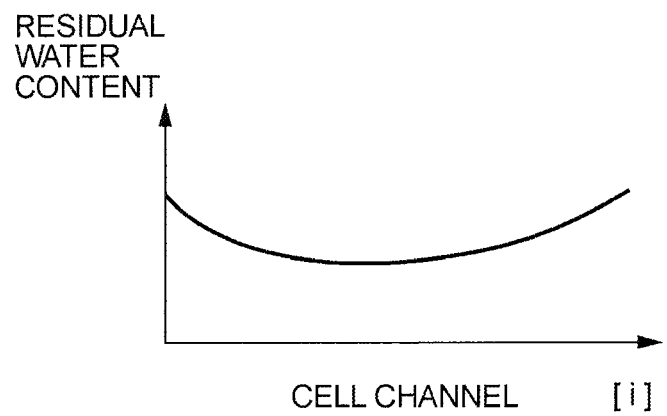
FIG. 21 is a diagram illustrating a cathode-side residual water content distribution in a cell lamination direction as estimated by the estimation method according to the embodiment.
Figure 22:
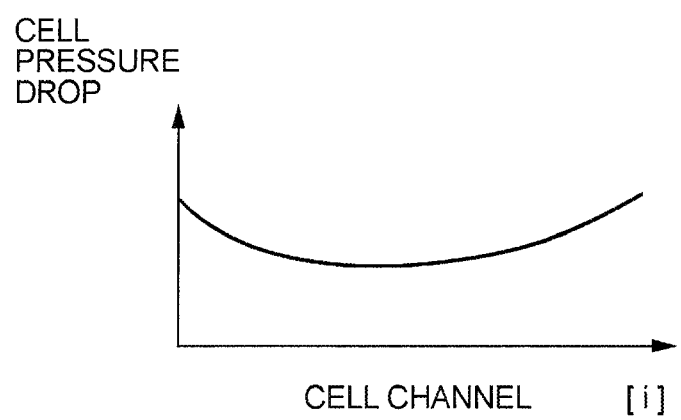
FIG. 22 is a diagram illustrating a cathode-side pressure drop distribution in the cell lamination direction as estimated from the residual water content distribution illustrated in FIG. 21.
Figure 23:
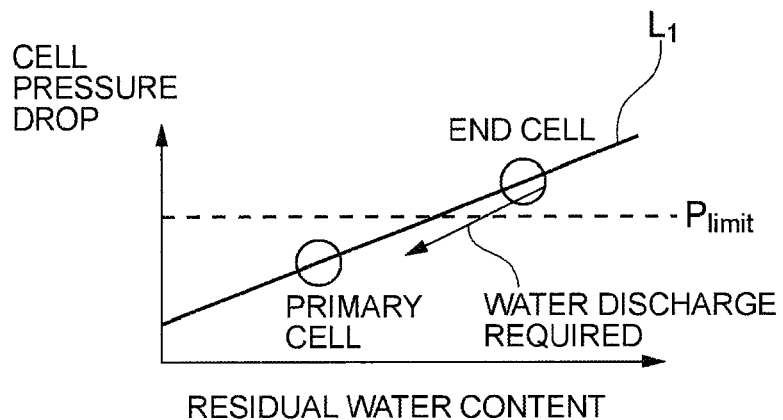
FIG. 23 is a diagram illustrating a relationship between cell pressure drop and residual water content according to the embodiment.
Figure 24:
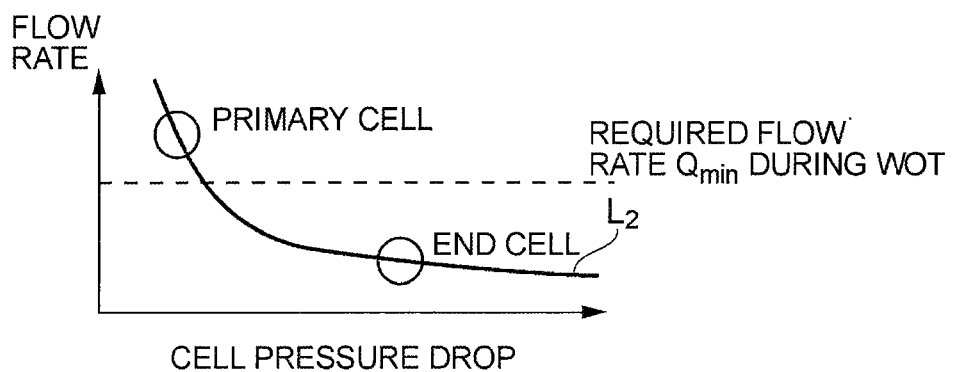
FIG. 24 is a diagram illustrating a relationship between reactant gas flow rate and cell pressure drop according to the embodiment.
Figure 25:
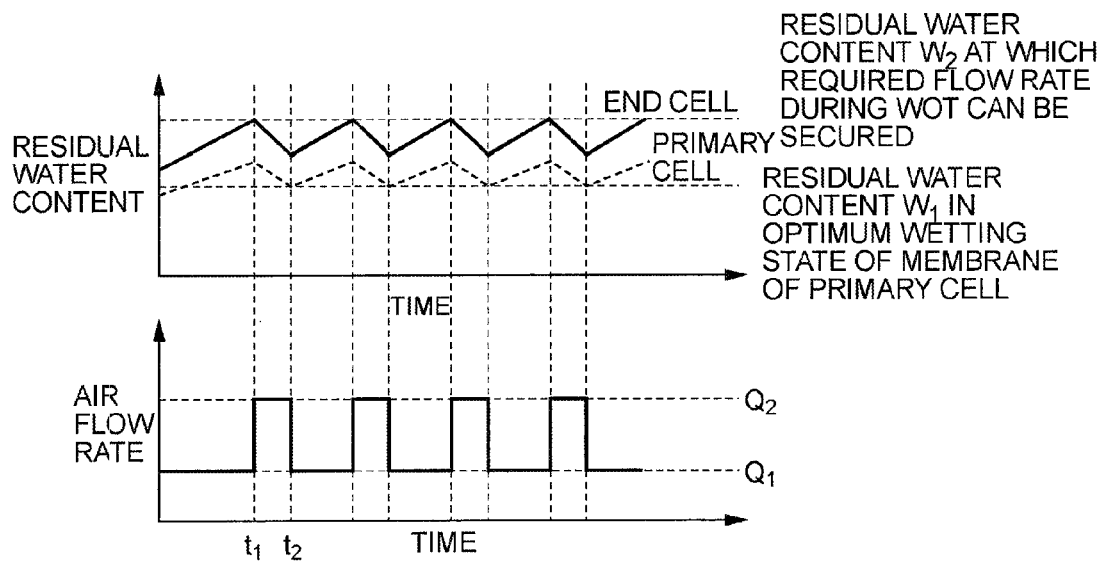
FIG. 25 is a timing chart illustrating processing on the cathode side during a residual water content reduction operation according to the embodiment.
Figure 26:
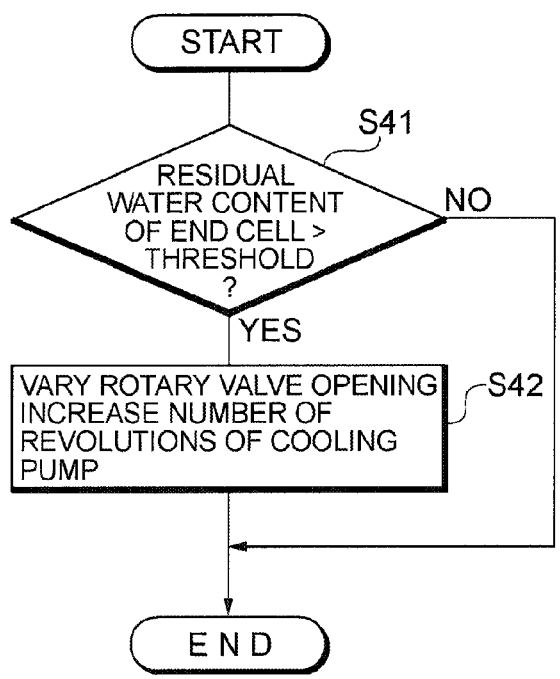
FIG. 26 is a flow chart illustrating a processing flow of equalization control of temperature distribution according to the embodiment.
Figure 27:
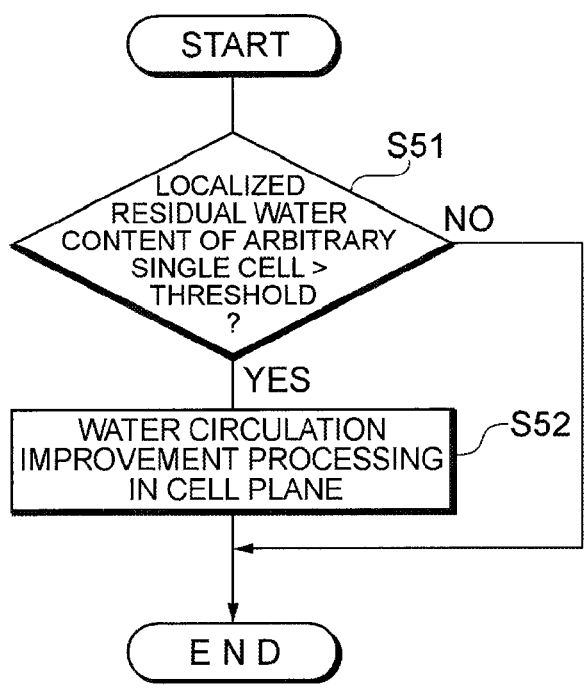
FIG. 27 is a flow chart illustrating a processing flow of equalization control of residual water content in a single cell according to the embodiment.
Figure 28:
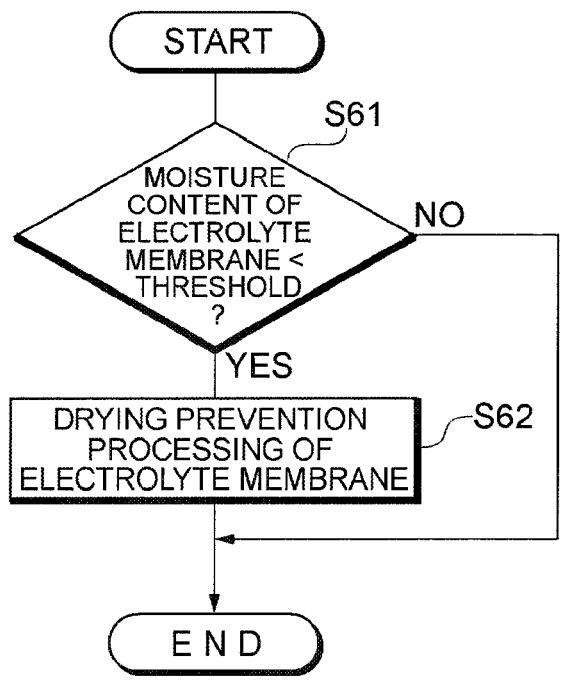
FIG. 28 is a flow chart illustrating a processing flow of drying prevention control of an electrolyte membrane according to the embodiment.

1: fuel cell
2: single cell

2a: primary cell
2b: end cell
23: electrolyte membrane
24A: anode electrode
24B: cathode electrode
25A: hydrogen flow channel (fuel gas flow channel)
25B: air flow channel (oxidation gas flow channel)
67: estimating unit
68: operation control unit
100: fuel cell system
300: air piping system
400: hydrogen piping system
500: coolant piping system
600: controller

The invention claimed is:

1. A water content estimation apparatus for a fuel cell which estimates a water content of a fuel cell including a single cell, the single cell having an anode electrode, a cathode electrode, an electrolyte membrane existing between the anode electrode and the cathode electrode, and reactant gas flow channels, including a fuel gas flow channel for supplying fuel gas to the anode electrode and an oxidation gas flow channel for supplying oxidation gas to the cathode electrode, the water content estimation apparatus for a fuel cell comprising:
an estimating unit for estimating a residual water content distribution in at least one of the reactant gas flow channels and a moisture content distribution in the electrolyte membrane in a cell plane of the single cell while taking into consideration water transfer that occurs between the anode electrode and the cathode electrode via the electrolyte membrane,
wherein the estimating unit is programmed to calculate a rate of water transfer via the electrolyte membrane between the anode electrode and the cathode electrode based on a difference in water vapor partial pressure between the anode electrode-side and the cathode electrode-side, and to estimate a residual water content distribution and a moisture content distribution based on the calculated water transfer rate.

2. The water content estimation apparatus for a fuel cell according to claim 1, wherein the estimating unit respectively estimates a residual water content distribution in the cell plane for the fuel gas flow channel and the oxidation gas flow channel.

3. The water content estimation apparatus for a fuel cell according to claim 2, wherein
the fuel cell includes a cell laminate formed by laminating a plurality of single cells, and
the estimating unit estimates a residual water content distribution and a moisture content distribution of each of said single cells.

4. The water content estimation apparatus for a fuel cell according to claim 3, wherein the estimating unit is programmed to estimate the residual water content distribution and the moisture content distribution of each of said single cells while taking into consideration at least one of a temperature distribution and a pressure drop distribution of the cell laminate in a cell lamination direction.

5. The water content estimation apparatus for a fuel cell according to claim 4, wherein the estimating unit is programmed to determine the temperature distribution, which temperature distribution includes a variation in heat discharge corresponding to a position of a single cell in the cell lamination direction.

6. The water content estimation apparatus for a fuel cell according to claim 4, wherein
each of said single cells is configured to be supplied with a coolant, and
the estimating unit calculates a temperature regarding each of said single cells while taking into consideration at least one of an external air temperature and a coolant flow rate to the cell laminate.

7. The water content estimation apparatus for a fuel cell according to claim 6, wherein the estimating unit calculates temperatures on an inlet side and an outlet side of the coolant of each of said single cells as the temperature regarding each of said single cells.

8. The water content estimation apparatus for a fuel cell according to claim 4, wherein the estimating unit is programmed to determine the pressure drop distribution, which pressure drop distribution includes a flow distribution variation of a reactant gas corresponding to a position of each of said single cells in the cell lamination direction.

9. The water content estimation apparatus according to claim 4, wherein
each of said single cells is configured to be supplied with a coolant, and
the pressure drop distribution includes a variation in coolant flow distribution corresponding to a position of each of said single cells in the cell lamination direction.

10. The water content estimation apparatus for a fuel cell according to claim 1, wherein the estimating unit is programmed to calculate humidity distributions of at least one of the reactant gas flow channels and the electrolyte membrane using the calculated water transfer rate, and to estimate the moisture content distribution based on the calculated electrolyte membrane humidity distribution.

11. The water content estimation apparatus for a fuel cell according to claim 10, wherein the estimating unit is programmed to estimate the residual water content distribution by adding a variance in liquid water in the at least one of the reactant gas flow channels to the calculated humidity distribution of the at least one of the reactant gas flow channels.

12. The water content estimation apparatus for a fuel cell according to claim 1, wherein the estimating unit is programmed to calculate the difference in water vapor partial pressure by measuring or calculating a dew point on the anode electrode-side and a dew point on the cathode electrode-side.

13. A fuel cell system comprising the water content estimation apparatus for a fuel cell according to claim 3,
the fuel cell system further comprising an operation control unit that controls operation of the fuel cell system based on an estimation result by the estimating unit so that the fuel cell assumes a predetermined water condition.

14. The fuel cell system according to claim 13, wherein the operation control unit is programmed to execute water reduction control so that a residual water content in a single cell at an end of the cell laminate does not exceed a predetermined upper limit.

15. The fuel cell system according to claim 14, wherein the operation control unit is programmed to suspend the execution of water reduction control so that a residual water content or a moisture content of a single cell at a central part of the cell laminate exceeds a predetermined lower limit.

16. The fuel cell system according to claim 14, wherein the operation control unit is programmed to execute water reduction control by controlling a device that varies a state quantity of fuel gas or oxidation gas to the fuel cell.

17. The fuel cell system according to claim 16, wherein the device includes at least one of a pump that feeds fuel gas to the fuel cell under pressure, a compressor that feeds oxidation gas to the fuel cell under pressure, and a back pressure valve that regulates a back pressure of the oxidation gas in the fuel cell.

18. The fuel cell system according to claim 13 further comprising
a coolant piping system for supplying a coolant to each of said single cells, wherein
the operation control unit is programmed to control the coolant piping system so as to equalize temperature distribution of the cell laminate in a cell lamination direction in a case where it is estimated that the residual water content in a single cell at an end of the cell laminate has increased due to a decrease in temperature.

19. The fuel cell system according to claim 13, wherein the operation control unit is programmed to vary a state quantity of fuel gas or oxidation gas to the fuel cell so as to equalize a residual water content in a cell plane in a case where it is estimated that the residual water content in the cell plane is locally high.

20. The fuel cell system according to claim 19, wherein the operation control unit is programmed to vary a state quantity of fuel gas to the fuel cell in a case where it is estimated that the residual water content of the fuel gas flow channel is locally high, while the operation control unit is programmed to vary a state quantity of oxidation gas to the fuel cell in a case where it is estimated that the residual water content of the oxidation gas flow channel is locally high.

21. The fuel cell system according to claim 13, wherein the operation control unit is programmed to vary a state quantity of fuel gas or oxidation gas to the fuel cell so as to suppress drying of the electrolyte membrane in a case where it is estimated that the residual water content at an arbitrary position of the electrolyte membrane is low.

22. The fuel cell system according to claim 13, wherein the operation control unit is programmed to increase a fuel concentration of fuel gas to the fuel cell in a case where a drop in cell voltage due to a rapid output increase request is predicted based on an estimated residual water content of the fuel gas flow channel.

* * * * *